(12) United States Patent
Kataoka et al.

(10) Patent No.: US 8,037,035 B2
(45) Date of Patent: Oct. 11, 2011

(54) APPARATUS FOR SEARCHING AND MANAGING COMPRESSED FILES

(75) Inventors: Masahiro Kataoka, Kawasaki (JP); Tatsuhiro Sato, Kawasaki (JP); Takashi Tsubokura, Setagaya (JP)

(73) Assignee: Fujitsu Limited, Kawasaki (JP)

( * ) Notice: Subject to any disclaimer, the term of this patent is extended or adjusted under 35 U.S.C. 154(b) by 409 days.

(21) Appl. No.: 12/361,316

(22) Filed: Jan. 28, 2009

(65) Prior Publication Data

US 2009/0299973 A1 Dec. 3, 2009

(30) Foreign Application Priority Data

May 30, 2008 (JP) .................................. 2008-143527

(51) Int. Cl.
*G06F 7/00* (2006.01)
*G06F 17/00* (2006.01)
*G06F 17/30* (2006.01)

(52) U.S. Cl. ........ 707/693; 707/623; 707/667; 707/673; 707/737

(58) Field of Classification Search .................. 707/693, 707/623, 667, 737, 673, 999.001
See application file for complete search history.

(56) References Cited

U.S. PATENT DOCUMENTS

| | | | | |
|---|---|---|---|---|
| 5,333,313 A | * | 7/1994 | Heising | 707/999.001 |
| 5,532,694 A | * | 7/1996 | Mayers et al. | 341/67 |
| 5,748,121 A | * | 5/1998 | Romriell | 341/65 |
| 6,061,398 A | * | 5/2000 | Satoh et al. | 375/240 |
| 6,112,208 A | * | 8/2000 | Ikegami | 707/693 |
| 6,650,256 B2 | * | 11/2003 | Kondo et al. | 341/50 |
| 7,307,552 B2 | * | 12/2007 | Ma et al. | 341/51 |
| 7,688,233 B2 | * | 3/2010 | Schneider | 341/51 |
| 2001/0043745 A1 | * | 11/2001 | Friederich et al. | 382/232 |
| 2004/0001543 A1 | * | 1/2004 | Adams et al. | 375/240 |
| 2008/0098024 A1 | | 4/2008 | Kataoka et al. | |
| 2008/0201718 A1 | * | 8/2008 | Zohar | 718/105 |

FOREIGN PATENT DOCUMENTS

WO  WO 2006/123448 A1  11/2006

OTHER PUBLICATIONS

A. Bookstein, S.T. Klein, and D.A. Zi. 1992, A systematic approach to compressing a full-text retrieval system. Information Processing & Management.*
Brisaboa, N., Iglesias, E. L., Navarro, G., & Paramá, J. R. (2003b). An efficient compression code for text databases. In Proceedings of the 25th European Conference on IR Research (ECIR'03) (pp. 468-481). LNCS 2633, Springer-Verlag.*
Saeed,F et al. "Data compression with Huffman coding; an efficient dynamic implementation using file partitioning", proceedings of the 1990 symposium on applied computing, 1990, pp. 348-354.*

* cited by examiner

*Primary Examiner* — Mohammad Ali
*Assistant Examiner* — Kannan Shanmugasundaram
(74) *Attorney, Agent, or Firm* — Greer, Burns & Crain, Ltd.

(57) ABSTRACT

A computer-readable, non-transitory medium stores a program that manages compressed file groups on a plurality of slave servers. The file groups include compressed files that are to be searched and have character strings. Each of the compressed file groups is expanded, using a Huffman tree that was used for compressing the compressed file group. A common compression parameter is generated based on appearance frequency, by summing, for each character, the appearance frequency in each of the compressed file groups. The expanded files are recompressed using the common Huffman tree such that sums of the access frequencies of the compressed files that are origins of the recompressed files are substantially equivalent among various slave servers. New archives including the re-compressed files are transmitted to the respective slave servers.

3 Claims, 36 Drawing Sheets

CHARACTER APPEARANCE MAP (SINGLE CHARACTER)

| TYPE OF CHARACTER | CHARACTER | BIT NUMBER |  |  |  |  |  |  |
|---|---|---|---|---|---|---|---|---|
|  |  | 1 | 2 | 3 | ... | i | ... | n |
| NUMERAL | 0 | 1 | 1 | 1 | ... | 1 | ... | 1 |
|  | ... | ... | ... | ... | ... | ... | ... | ... |
|  | 9 | 1 | 1 | 1 | ... | 1 | ... | 1 |
| LOWER CASE ALPHABET | a | 1 | 1 | 1 | ... | 1 | ... | 1 |
|  | ... | ... | ... | ... | ... | ... | ... | ... |
|  | z | 0 | 0 | 1 | ... | 0 | ... | 1 |
| UPPER CASE ALPHABET | A | 1 | 1 | 1 | ... | 1 | ... | 1 |
|  | ... | ... | ... | ... | ... | ... | ... | ... |
|  | Z | 0 | 0 | 0 | ... | 1 | ... | 0 |
| HIRAGATA | あ | 1 | 1 | 1 | ... | 1 | ... | 1 |
|  | ... | ... | ... | ... | ... | ... | ... | ... |
|  | ん | 1 | 1 | 1 | ... | 1 | ... | 1 |
| KATAKANA | ア | 1 | 1 | 1 | ... | 1 | ... | 1 |
|  | ... | ... | ... | ... | ... | ... | ... | ... |
|  | ン | 1 | 1 | 1 | ... | 1 | ... | 1 |
| KANJI CHARACTER | 足 | 0 | 0 | 0 | ... | 0 | ... | 0 |
|  | ... | ... | ... | ... | ... | ... | ... | ... |
|  | 吾 | 0 | 0 | 0 | ... | 0 | ... | 0 |

CHARACTER APPEARANCE MAP (CONSECUTIVE CHARACTERS)

| TYPE OF CHARACTER | CONSECUTIVE CHARACTERS | BIT NUMBER |  |  |  |  |  |  |
|---|---|---|---|---|---|---|---|---|
|  |  | 1 | 2 | 3 | ... | i | ... | n |
| NUMERAL | 00 | 0 | 0 | 0 | ... | 0 | ... | 0 |
|  | ... | ... | ... | ... | ... | ... | ... | ... |
|  | 99 | 0 | 1 | 0 | ... | 0 | ... | 1 |
| LOWER CASE ALPHABET | aa | 0 | 0 | 0 | ... | 0 | ... | 0 |
|  | ... | ... | ... | ... | ... | ... | ... | ... |
|  | zz | 0 | 0 | 0 | ... | 0 | ... | 0 |
| UPPER CASE ALPHABET | AA | 0 | 0 | 0 | ... | 0 | ... | 0 |
|  | ... | ... | ... | ... | ... | ... | ... | ... |
|  | ZZ | 0 | 0 | 0 | ... | 0 | ... | 0 |
| HIRAGATA | ああ | 0 | 0 | 0 | ... | 0 | ... | 0 |
|  | ... | ... | ... | ... | ... | ... | ... | ... |
|  | んん | 0 | 0 | 0 | ... | 0 | ... | 0 |
| KATAKANA | アア | 0 | 0 | 0 | ... | 0 | ... | 0 |
|  | ... | ... | ... | ... | ... | ... | ... | ... |
|  | ンン | 0 | 0 | 0 | ... | 0 | ... | 0 |
| KANJI CHARACTER | 足足 | 0 | 0 | 0 | ... | 0 | ... | 0 |
|  | ... | ... | ... | ... | ... | ... | ... | ... |
|  | 吾吾 | 0 | 0 | 0 | ... | 0 | ... | 0 |

| COMPRESSION PARAMETER | |
|---|---|
| CHARACTER/CONSECUTIVE CHARACTER | FREQUENCY OF APPEARANCE |
| 0 | 98657 |
| ... | ... |
| 9 | 35726 |
| a | 45989 |
| ... | ... |
| z | 16572 |
| A | 5782 |
| ... | ... |
| Z | 6586 |
| あ | 85794 |
| ... | ... |
| ん | 28580 |
| ア | 65237 |
| ... | ... |
| ン | 29116 |
| 足 | 5871 |
| ... | ... |
| 吾 | 528 |
| 00 | 3895 |
| ... | ... |
| 99 | 369 |
| ... | ... |

| FILE PATH TABLE | | | | |
|---|---|---|---|---|
| FILE ID | FILE PATH | HEADWORD | ADDRESS | SIZE |
| f1 | honmon\file1.html | あ<br>... | adr1 | s1 |
| ... | ... | ... | ... | ... |
| f23 | honmon\file23.html | 川端康成<br>... | adr23 | s23 |
| ... | ... | ... | ... | ... |
| f158 | honmon\file158.html | 伊豆の踊り子<br>... | adr158 | s158 |
| ... | ... | ... | ... | ... |
| fi | honmon\filei.html | ... | adri | si |
| ... | ... | ... | ... | ... |
| f4971 | honmon\file4971.html | 雪国<br>... | adr4971 | s4971 |
| ... | ... | ... | ... | ... |
| fn | honmon\filen.html | ...<br>ん | adrn | sn |

FIG.8

CHARACTER APPEARANCE MAP LINKING TABLE (211)

| BIT NUMBER | ADDRESS | SIZE | ACCESS FREQUENCY | RESIDENT FLAG |
|---|---|---|---|---|
| 1 | adr1 | s1 | 57 | 1 |
| ... | ... | ... | ... | ... |
| i | adri | si | 103 | 1 |
| ... | ... | ... | ... | ... |
| n | adrn | sn | 8 | 0 |

FIG.9

FILE PATH LINKING TABLE (212)

| BIT NUMBER | FILE PATH |
|---|---|
| 1 | honmon\file1.html |
| ... | ... |
| i | honmon\filei.html |
| ... | ... |
| n | honmon\filen.html |

FIG.10

VIRTUAL ARCHIVE CAPACITY TABLE (213)

| BIT NUMBER | ACCESS FREQUENCY | SIZE |
|---|---|---|
| 3015 | 241 | s3015 |
| 867 | 239 | s867 |
| ... | ... | ... |
| 54 | 92 | s54 |

| CHARACTER | BIT NUMBER | | | | | | | | |
|---|---|---|---|---|---|---|---|---|---|
| | 1 | ... | 23 | ... | 158 | ... | 4971 | ... | n |
| 川 | 1 | ... | 1 | ... | 1 | ... | 1 | ... | 0 |
| 端 | 1 | ... | 1 | ... | 1 | ... | 1 | ... | 0 |
| 康 | 1 | ... | 1 | ... | 1 | ... | 1 | ... | 0 |
| 成 | 1 | ... | 1 | ... | 1 | ... | 1 | ... | 0 |
| LOGICAL PRODUCT | 1 | ... | 1 | ... | 1 | ... | 1 | ... | 0 |

(A)

| COMPRESSION SYMBOL | CATEGORY | CHARACTER |
|---|---|---|
| 0 | 8 BITS | e |
| 100 | 16 BITS | d |
| 101 | 16 BITS | c |
| 110 | 16 BITS | f |
| 1110 | 16 BITS | b |
| 1111 | 16 BITS | a |

(B)

| COMPRESSION PARAMETER | |
|---|---|
| FREQUENCY OF APPEARANCE | CHARACTER |
| 32 | e |
| 31 | d |
| 30 | c |
| 23 | f |
| 13 | b |
| 3 | a |

(A)

| COMPRESSION SYMBOL | CATEGORY | CHARACTER |
|---|---|---|
| 0 | 16 BITS | a |
| 100 | 16 BITS | b |
| 101 | 16 BITS | c |
| 110 | 16 BITS | d |
| 1110 | 8 BITS | e |
| 1111 | 8 BITS | f |

2000

(B)

| COMPRESSION PARAMETER | |
|---|---|
| FREQUENCY OF APPEARANCE | CHARACTER |
| 21 | a |
| 18 | b |
| 15 | c |
| 12 | d |
| 9 | e |
| 6 | f |

P2

(A)

| COMPRESSION SYMBOL | CATEGORY | CHARACTER |
|---|---|---|
| 0 | 16 BITS | c |
| 100 | 16 BITS | d |
| 101 | 8 BITS | e |
| 110 | 16 BITS | b |
| 1110 | 8 BITS | f |
| 1111 | 16 BITS | a |

2200

(B)

| COMPRESSION PARAMETER | |
|---|---|
| FREQUENCY OF APPEARANCE | CHARACTER |
| 45 | c |
| 43 | d |
| 41 | e |
| 31 | b |
| 29 | f |
| 24 | a |

| CHARACTER APPEARANCE MAP (SINGLE CHARACTER) | | | | | | | |
|---|---|---|---|---|---|---|---|
| TYPE OF CHARACTER | CHARACTER | BIT NUMBER | | | | | |
| | | a_1 | a_2 | a_3 | ... | a_i | ... | a_n |
| NUMERAL | 0 | 1 | 1 | 1 | ... | 1 | ... | 1 |
| | ... | ... | ... | ... | ... | ... | ... | ... |
| | 9 | 1 | 1 | 1 | ... | 1 | ... | 1 |
| LOWER CASE ALPHABET | a | 1 | 1 | 1 | ... | 1 | ... | 1 |
| | ... | ... | ... | ... | ... | ... | ... | ... |
| | z | 0 | 0 | 1 | ... | 0 | ... | 1 |
| UPPER CASE ALPHABET | A | 1 | 1 | 1 | ... | 1 | ... | 1 |
| | ... | ... | ... | ... | ... | ... | ... | ... |
| | Z | 0 | 0 | 0 | ... | 1 | ... | 0 |
| HIRAGATA | あ | 1 | 1 | 1 | ... | 1 | ... | 1 |
| | ... | ... | ... | ... | ... | ... | ... | ... |
| | ん | 1 | 1 | 1 | ... | 1 | ... | 1 |
| KATAKANA | ア | 1 | 1 | 1 | ... | 1 | ... | 1 |
| | ... | ... | ... | ... | ... | ... | ... | ... |
| | ン | 1 | 1 | 1 | ... | 1 | ... | 1 |
| KANJI CHARACTER | 足 | 0 | 0 | 0 | ... | 0 | ... | 0 |
| | ... | ... | ... | ... | ... | ... | ... | ... |
| | 吾 | 0 | 0 | 0 | ... | 0 | ... | 0 |

FIG.26 Ma2

| CHARACTER APPEARANCE MAP (CONSECUTIVE CHARACTERS) | | | | | | | |
|---|---|---|---|---|---|---|---|
| TYPE OF CHARACTER | CONSECUTIVE CHARACTERS | BIT NUMBER | | | | | |
| | | a_1 | a_2 | a_3 | ... | a_i | ... | a_n |
| NUMERAL | 00 | 0 | 0 | 0 | ... | 0 | ... | 0 |
| | ... | ... | ... | ... | ... | ... | ... | ... |
| | 99 | 0 | 1 | 0 | ... | 0 | ... | 1 |
| LOWER CASE ALPHABET | aa | 0 | 0 | 0 | ... | 0 | ... | 0 |
| | ... | ... | ... | ... | ... | ... | ... | ... |
| | zz | 0 | 0 | 0 | ... | 0 | ... | 0 |
| UPPER CASE ALPHABET | AA | 0 | 0 | 0 | ... | 0 | ... | 0 |
| | ... | ... | ... | ... | ... | ... | ... | ... |
| | ZZ | 0 | 0 | 0 | ... | 0 | ... | 0 |
| HIRAGATA | ああ | 0 | 0 | 0 | ... | 0 | ... | 0 |
| | ... | ... | ... | ... | ... | ... | ... | ... |
| | んん | 0 | 0 | 0 | ... | 0 | ... | 0 |
| KATAKANA | アア | 0 | 0 | 0 | ... | 0 | ... | 0 |
| | ... | ... | ... | ... | ... | ... | ... | ... |
| | ンン | 0 | 0 | 0 | ... | 0 | ... | 0 |
| KANJI CHARACTER | 足足 | 0 | 0 | 0 | ... | 0 | ... | 0 |
| | ... | ... | ... | ... | ... | ... | ... | ... |
| | 吾吾 | 0 | 0 | 0 | ... | 0 | ... | 0 |

FIG.27 P1

| COMPRESSION PARAMETER | |
|---|---|
| CHARACTER/CONSECUTIVE CHARACTER | FREQUENCY OF APPEARANCE |
| 0 | 98657 |
| ... | ... |
| 9 | 35726 |
| a | 45989 |
| ... | ... |
| z | 16572 |
| A | 5782 |
| ... | ... |
| Z | 6586 |
| あ | 85794 |
| ... | ... |
| ん | 28580 |
| ア | 65237 |
| ... | ... |
| ン | 29116 |
| 足 | 5871 |
| ... | ... |
| 吾 | 528 |
| 00 | 3895 |
| ... | ... |
| 99 | 369 |
| ... | ... |

FIG.28 222a

| FILE PATH TABLE | | | | |
|---|---|---|---|---|
| FILE ID | FILE PATH | HEADWORD | ADDRESS | SIZE |
| fa_1 | honmon\filea_1.html | あ<br>... | adra_1 | sa_1 |
| ... | ... | ... | ... | ... |
| fa_23 | honmon\filea_23.html | 川端康成<br>... | adra_23 | sa_23 |
| ... | ... | ... | ... | ... |
| fa_158 | honmon\filea_158.html | 伊豆の踊り子<br>... | adra_158 | sa_158 |
| ... | ... | ... | ... | ... |
| fa_i | honmon\filea_i.html | ... | adra_i | sa_i |
| ... | ... | ... | ... | ... |
| fa_4971 | honmon\filea_4971.html | 雪国<br>... | adra_4971 | sa_4971 |
| ... | ... | ... | ... | ... |
| fa_n | honmon\filea_n.html | ...<br>ん | adra_n | sa_n |

| CHARACTER APPEARANCE MAP LINKING TABLE ||||||
|---|---|---|---|---|
| BIT NUMBER | ADDRESS | SIZE | ACCESS FREQUENCY | RESIDENT FLAG |
| a_1 | adra_1 | sa_1 | 57 | 1 |
| ... | ... | ... | ... | ... |
| a_i | adra_i | sa_i | 103 | 1 |
| ... | ... | ... | ... | ... |
| a_n | adra_n | sa_n | 8 | 0 |

| FILE PATH LINKING TABLE ||
|---|---|
| BIT NUMBER | FILE PATH |
| a_1 | honmon\filea_1.html |
| ... | ... |
| a_i | honmon\filea_i.html |
| ... | ... |
| a_n | honmon\filea_n.html |

| CHARACTER APPEARANCE MAP (SINGLE CHARACTER) |||||||||
|---|---|---|---|---|---|---|---|---|
| TYPE OF CHARACTER | CHARACTER | BIT NUMBER |||||||
| | | b_1 | b_2 | b_3 | ... | b_i | ... | b_m |
| NUMERAL | 0 | 1 | 1 | 1 | ... | 1 | ... | 1 |
| | ... | ... | ... | ... | ... | ... | ... | ... |
| | 9 | 1 | 1 | 1 | ... | 1 | ... | 1 |
| LOWER CASE ALPHABET | a | 1 | 1 | 1 | ... | 1 | ... | 1 |
| | ... | ... | ... | ... | ... | ... | ... | ... |
| | z | 0 | 0 | 1 | ... | 0 | ... | 1 |
| UPPER CASE ALPHABET | A | 1 | 1 | 1 | ... | 1 | ... | 1 |
| | ... | ... | ... | ... | ... | ... | ... | ... |
| | Z | 0 | 0 | 0 | ... | 1 | ... | 0 |
| HIRAGATA | あ | 1 | 1 | 1 | ... | 1 | ... | 1 |
| | ... | ... | ... | ... | ... | ... | ... | ... |
| | ん | 1 | 1 | 1 | ... | 1 | ... | 1 |
| KATAKANA | ア | 1 | 1 | 1 | ... | 1 | ... | 1 |
| | ... | ... | ... | ... | ... | ... | ... | ... |
| | ン | 1 | 1 | 1 | ... | 1 | ... | 1 |
| KANJI CHARACTER | 足 | 0 | 0 | 0 | ... | 0 | ... | 0 |
| | ... | ... | ... | ... | ... | ... | ... | ... |
| | 吾 | 0 | 0 | 0 | ... | 0 | ... | 0 |

| CHARACTER APPEARANCE MAP (CONSECUTIVE CHARACTERS) ||||||||
|---|---|---|---|---|---|---|---|
| TYPE OF CHARACTER | CONSECUTIVE CHARACTERS | BIT NUMBER ||||||
| | | $b\_1$ | $b\_2$ | $b\_3$ | ... | $b\_j$ | ... | $b\_m$ |
| NUMERAL | 00 | 0 | 0 | 0 | ... | 0 | ... | 0 |
| | ... | ... | ... | ... | ... | ... | ... | ... |
| | 99 | 0 | 1 | 0 | ... | 0 | ... | 1 |
| LOWER CASE ALPHABET | aa | 0 | 0 | 0 | ... | 0 | ... | 0 |
| | ... | ... | ... | ... | ... | ... | ... | ... |
| | zz | 0 | 0 | 0 | ... | 0 | ... | 0 |
| UPPER CASE ALPHABET | AA | 0 | 0 | 0 | ... | 0 | ... | 0 |
| | ... | ... | ... | ... | ... | ... | ... | ... |
| | ZZ | 0 | 0 | 0 | ... | 0 | ... | 0 |
| HIRAGATA | ああ | 0 | 0 | 0 | ... | 0 | ... | 0 |
| | ... | ... | ... | ... | ... | ... | ... | ... |
| | んん | 0 | 0 | 0 | ... | 0 | ... | 0 |
| KATAKANA | アア | 0 | 0 | 0 | ... | 0 | ... | 0 |
| | ... | ... | ... | ... | ... | ... | ... | ... |
| | ンン | 0 | 0 | 0 | ... | 0 | ... | 0 |
| KANJI CHARACTER | 足足 | 0 | 0 | 0 | ... | 0 | ... | 0 |
| | ... | ... | ... | ... | ... | ... | ... | ... |
| | 吾吾 | 0 | 0 | 0 | ... | 0 | ... | 0 |

| COMPRESSION PARAMETER ||
|---|---|
| CHARACTER/CONSECUTIVE CHARACTER | FREQUENCY OF APPEARANCE |
| 0 | 57820 |
| ... | ... |
| 9 | 12879 |
| a | 226854 |
| ... | ... |
| z | 4780 |
| A | 6599 |
| ... | ... |
| Z | 3001 |
| あ | 77259 |
| ... | ... |
| ん | 41938 |
| ア | 52108 |
| ... | ... |
| ン | 10047 |
| 足 | 3180 |
| ... | ... |
| 吾 | 98 |
| 00 | 15983 |
| ... | ... |
| 99 | 74 |
| ... | ... |

FIG.35

FILE PATH TABLE 222b

| FILE ID | FILE PATH | HEADWORD | ADDRESS | SIZE |
|---|---|---|---|---|
| fb_1 | honmon/fileb_1.html | ... | adrb_1 | sb_1 |
| ... | ... | ... | ... | ... |
| fb_j | honmon/fileb_j.html | 地球温暖化 | adrb_j | sb_j |
| ... | ... | ... | ... | ... |
| fb_m | honmon/fileb_m.html | ... | adrb_m | sb_m |

FIG.36

CHARACTER APPEARANCE MAP LINKING TABLE 211b

| BIT NUMBER | ADDRESS | SIZE | ACCESS FREQUENCY | RESIDENT FLAG |
|---|---|---|---|---|
| b_1 | adrb_1 | sb_1 | 954 | 1 |
| ... | ... | ... | ... | ... |
| b_j | adrb_j | sb_j | 15 | 0 |
| ... | ... | ... | ... | ... |
| b_m | adrb_m | sb_m | 1097 | 1 |

FIG.37

FILE PATH LINKING TABLE 212b

| BIT NUMBER | FILE PATH |
|---|---|
| b_1 | honmon\fileb_1.html |
| ... | ... |
| b_j | honmon\fileb_j.html |
| ... | ... |
| b_n | honmon\fileb_m.html |

FIG.38
| COMPRESSION PARAMETER ||
| --- | --- |
| CHARACTER/ CONSECUTIVE CHARACTER | FREQUENCY OF APPEARANCE |
| 0 | 98657 |
| ... | ... |
| 9 | 35726 |
| a | 45989 |
| ... | ... |
| z | 16572 |
| A | 5782 |
| ... | ... |
| Z | 6586 |
| あ | 85794 |
| ... | ... |
| ん | 28580 |
| ア | 65237 |
| ... | ... |
| ン | 29116 |
| 足 | 5871 |
| ... | ... |
| 吾 | 528 |
| 00 | 3895 |
| ... | ... |
| 99 | 369 |
| ... | ... |
P1
| COMPRESSION PARAMETER ||
| --- | --- |
| CHARACTER/ CONSECUTIVE CHARACTER | FREQUENCY OF APPEARANCE |
| 0 | 57820 |
| ... | ... |
| 9 | 12879 |
| a | 226854 |
| ... | ... |
| z | 4780 |
| A | 6599 |
| ... | ... |
| Z | 3001 |
| あ | 77259 |
| ... | ... |
| ん | 41938 |
| ア | 52108 |
| ... | ... |
| ン | 10047 |
| 足 | 3180 |
| ... | ... |
| 吾 | 98 |
| 00 | 15983 |
| ... | ... |
| 99 | 74 |
| ... | ... |
P2
| COMPRESSION PARAMETER ||
| --- | --- |
| CHARACTER/ CONSECUTIVE CHARACTER | FREQUENCY OF APPEARANCE |
| 0 | 156477 |
| ... | ... |
| 9 | 48605 |
| a | 272843 |
| ... | ... |
| z | 21352 |
| A | 12381 |
| ... | ... |
| Z | 9587 |
| あ | 163053 |
| ... | ... |
| ん | 70518 |
| ア | 117345 |
| ... | ... |
| ン | 39163 |
| 足 | 9051 |
| ... | ... |
| 吾 | 626 |
| 00 | 19878 |
| ... | ... |
| 99 | 443 |
| ... | ... |
P

FIG.39

| CHARACTER APPEARANCE MAP LINKING TABLE 211a | | | |
|---|---|---|---|
| BIT NUMBER | AD-DRESS | SIZE | ACCESS FREQUENCY | RESIDENT FLAG |
| a_1 | adra_1 | sa_1 | 57 | 1 |
| ... | ... | ... | ... | ... |
| a_i | adra_i | sa_i | 103 | 1 |
| ... | ... | ... | ... | ... |
| a_n | adra_n | sa_n | 8 | 0 |

| CHARACTER APPEARANCE MAP LINKING TABLE 211b | | | |
|---|---|---|---|
| BIT NUMBER | AD-DRESS | SIZE | ACCESS FREQUENCY | RESIDENT FLAG |
| b_1 | adrb_1 | sb_1 | 954 | 1 |
| ... | ... | ... | ... | ... |
| b_j | adrb_j | sb_j | 15 | 0 |
| ... | ... | ... | ... | ... |
| b_m | adrb_m | sb_m | 1097 | 1 |

| CHARACTER APPEARANCE MAP LINKING TABLE 3900 | | |
|---|---|---|
| SORT POSITION | BIT NUMBER | ACCESS FREQUENCY |
| 1 | b_m | 1097 |
| ... | ... | ... |
| ... | b_1 | 854 |
| ... | ... | ... |
| ... | a_i | 103 |
| ... | ... | ... |
| ... | a_1 | 57 |
| ... | b_j | 15 |
| ... | ... | ... |
| n+m | a_n | 8 |

| CHARACTER APPEARANCE MAP LINKING TABLE 3900a | | |
|---|---|---|
| SORT POSITION | BIT NUMBER | ACCESS FREQUENCY |
| 1 | b_m | 1097 |
| 3 | ... | ... |
| 5 | ... | ... |
| 7 | ... | ... |
| ... | ... | ... |
| n+m−1 | b_j | 15 |

| CHARACTER APPEARANCE MAP LINKING TABLE 3900b | | |
|---|---|---|
| SORT POSITION | BIT NUMBER | ACCESS FREQUENCY |
| 2 | b_1 | 954 |
| 4 | ... | ... |
| 6 | ... | ... |
| 8 | ... | ... |
| ... | ... | ... |
| n+m | a_n | 8 |

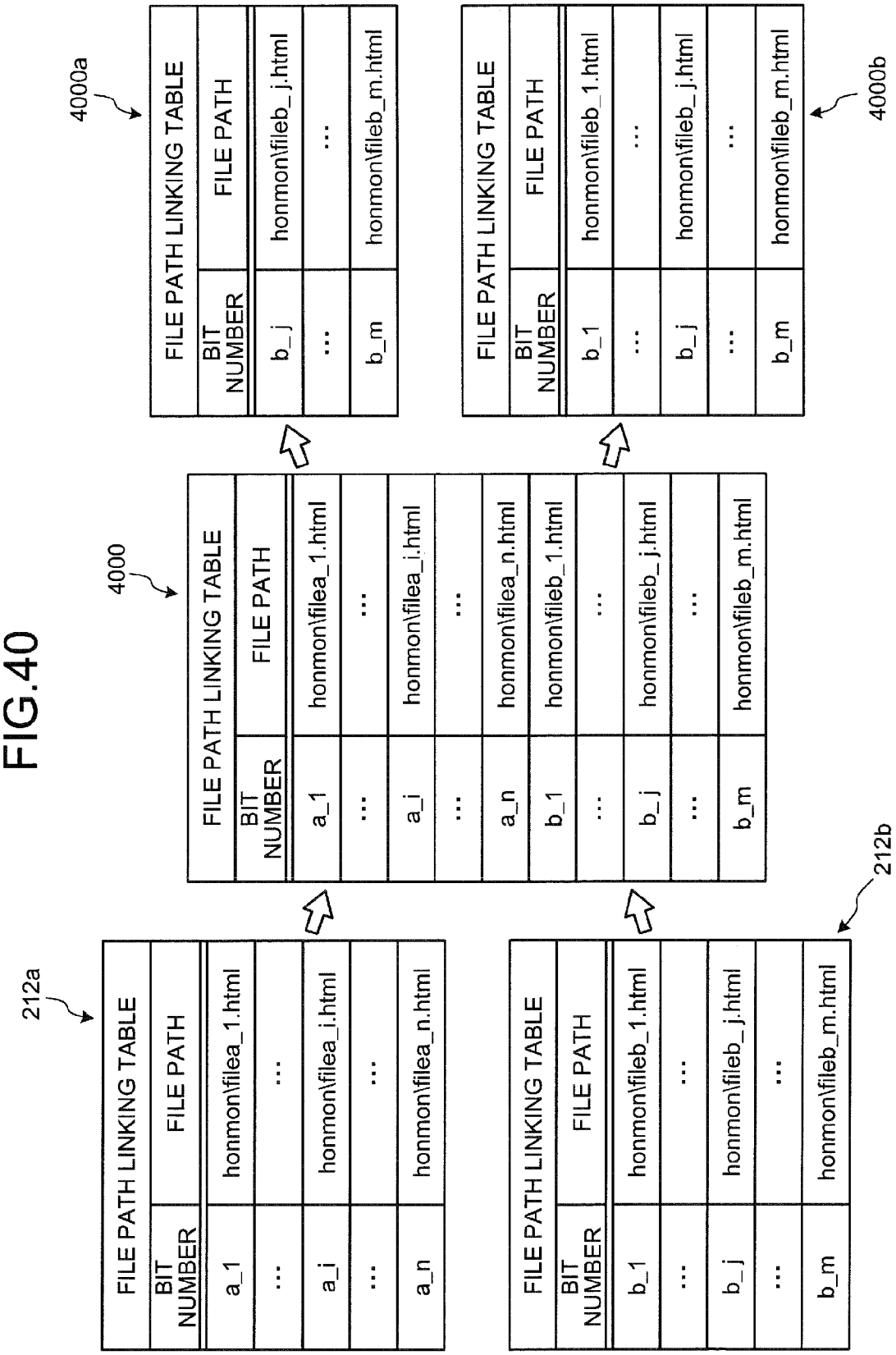

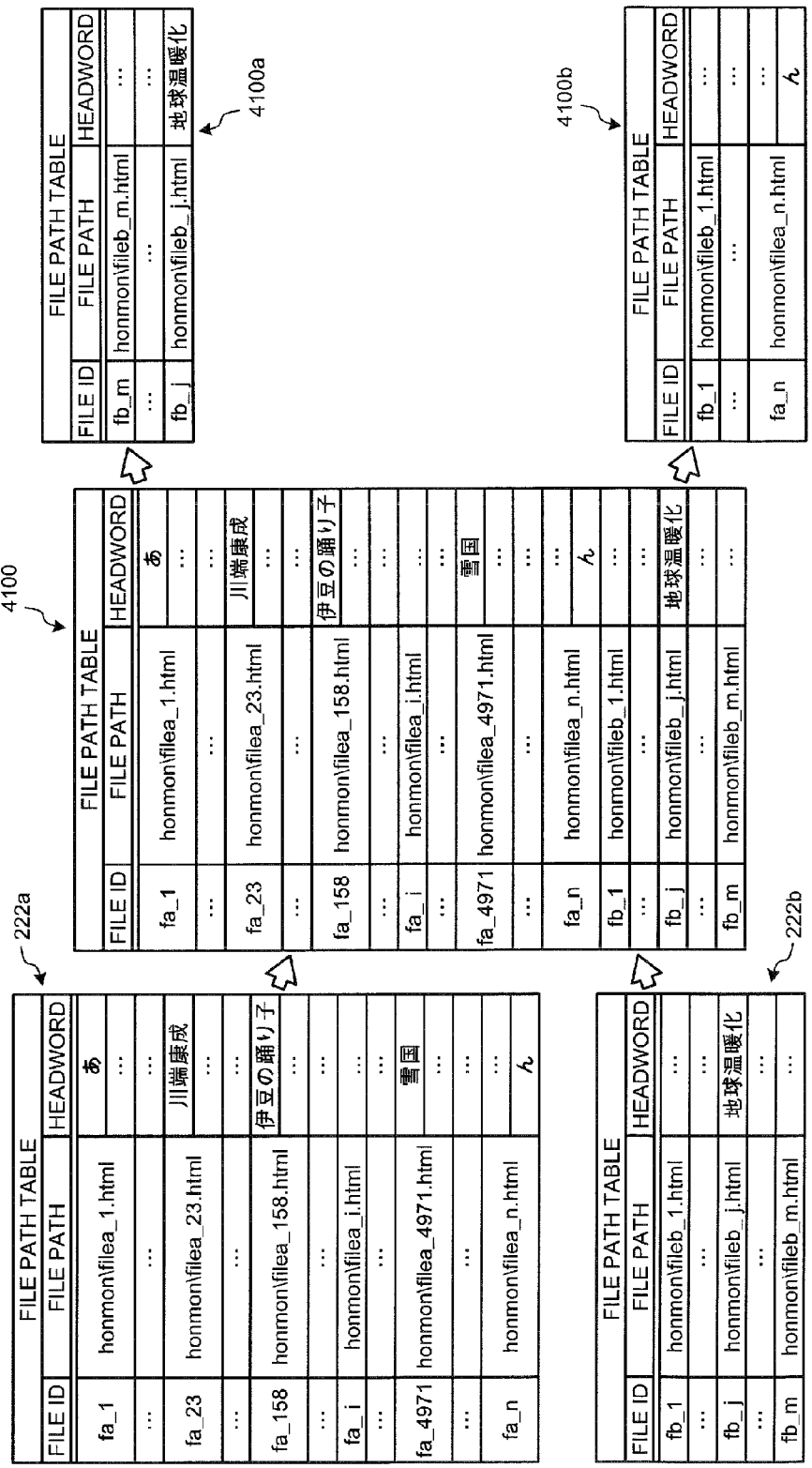

FIG.42

| CHARACTER APPEARANCE MAP (SINGLE CHARACTER) | | | | | | |
|---|---|---|---|---|---|---|
| TYPE OF CHARACTER | CHARACTER | \multicolumn{5}{c|}{BIT NUMBER} |
| | | a_1 | ... | a_i | ... | a_n |
| NUMERAL | 0 | 1 | ... | 1 | ... | 1 |
| | ... | ... | ... | ... | ... | ... |
| | 9 | 1 | ... | 1 | ... | 1 |
| LOWER CASE ALPHABET | a | 1 | ... | 0 | ... | 1 |
| | ... | ... | ... | ... | ... | ... |
| | z | 0 | ... | 1 | ... | 0 |
| UPPER CASE ALPHABET | A | 1 | ... | 1 | ... | 1 |
| | ... | ... | ... | ... | ... | ... |
| | Z | 1 | ... | 1 | ... | 1 |
| HIRAGATA | あ | 1 | ... | 1 | ... | 1 |
| | ... | ... | ... | ... | ... | ... |
| | ん | 1 | ... | 1 | ... | 1 |
| KATAKANA | ア | 1 | ... | 0 | ... | 0 |
| | ... | ... | ... | ... | ... | ... |
| | ン | 0 | ... | 1 | ... | 1 |
| KANJI CHARACTER | 足 | 1 | ... | 1 | ... | 0 |
| | ... | ... | ... | ... | ... | ... |
| | 吾 | 0 | ... | 0 | ... | 0 |

Ma1

| CHARACTER APPEARANCE MAP (SINGLE CHARACTER) | | | | | | |
|---|---|---|---|---|---|---|
| TYPE OF CHARACTER | CHARACTER | \multicolumn{5}{c|}{BIT NUMBER} |
| | | b_1 | ... | b_j | ... | b_m |
| NUMERAL | 0 | 1 | ... | 1 | ... | 1 |
| | ... | ... | ... | ... | ... | ... |
| | 9 | 1 | ... | 1 | ... | 1 |
| LOWER CASE ALPHABET | a | 1 | ... | 0 | ... | 1 |
| | ... | ... | ... | ... | ... | ... |
| | z | 0 | ... | 1 | ... | 0 |
| UPPER CASE ALPHABET | A | 1 | ... | 1 | ... | 1 |
| | ... | ... | ... | ... | ... | ... |
| | Z | 1 | ... | 1 | ... | 1 |
| HIRAGATA | あ | 1 | ... | 1 | ... | 1 |
| | ... | ... | ... | ... | ... | ... |
| | ん | 1 | ... | 1 | ... | 1 |
| KATAKANA | ア | 1 | ... | 0 | ... | 0 |
| | ... | ... | ... | ... | ... | ... |
| | ン | 0 | ... | 1 | ... | 1 |
| KANJI CHARACTER | 足 | 1 | ... | 1 | ... | 0 |
| | ... | ... | ... | ... | ... | ... |
| | 吾 | 0 | ... | 0 | ... | 0 |

Mb1

⇓ ⇓

Mab1

| CHARACTER APPEARANCE MAP (SINGLE CHARACTER) | | | | | | | | | | |
|---|---|---|---|---|---|---|---|---|---|---|
| TYPE OF CHARACTER | CHARACTER | \multicolumn{9}{c|}{BIT NUMBER} |
| | | a_1 | ... | a_i | ... | a_n | b_1 | ... | b_j | ... | b_m |
| NUMERAL | 0 | 1 | ... | 1 | ... | 1 | 1 | ... | 1 | ... | 1 |
| | ... | ... | ... | ... | ... | ... | ... | ... | ... | ... | ... |
| | 9 | 1 | ... | 1 | ... | 1 | 1 | ... | 1 | ... | 1 |
| LOWER CASE ALPHABET | a | 1 | ... | 0 | ... | 1 | 1 | ... | 0 | ... | 1 |
| | ... | ... | ... | ... | ... | ... | ... | ... | ... | ... | ... |
| | z | 0 | ... | 1 | ... | 0 | 0 | ... | 1 | ... | 0 |
| UPPER CASE ALPHABET | A | 1 | ... | 1 | ... | 1 | 1 | ... | 1 | ... | 1 |
| | ... | ... | ... | ... | ... | ... | ... | ... | ... | ... | ... |
| | Z | 1 | ... | 1 | ... | 1 | 1 | ... | 1 | ... | 1 |
| HIRAGATA | あ | 1 | ... | 1 | ... | 1 | 1 | ... | 1 | ... | 1 |
| | ... | ... | ... | ... | ... | ... | ... | ... | ... | ... | ... |
| | ん | 1 | ... | 1 | ... | 1 | 1 | ... | 1 | ... | 1 |
| KATAKANA | ア | 1 | ... | 0 | ... | 0 | 1 | ... | 0 | ... | 0 |
| | ... | ... | ... | ... | ... | ... | ... | ... | ... | ... | ... |
| | ン | 0 | ... | 1 | ... | 1 | 0 | ... | 1 | ... | 1 |
| KANJI CHARACTER | 足 | 1 | ... | 1 | ... | 0 | 1 | ... | 1 | ... | 0 |
| | ... | ... | ... | ... | ... | ... | ... | ... | ... | ... | ... |
| | 吾 | 0 | ... | 0 | ... | 0 | 0 | ... | 0 | ... | 0 |

⇑ MA1       ⇑ MA2

| CHARACTER APPEARANCE MAP (SINGLE CHARACTER) | | | | | | |
|---|---|---|---|---|---|---|
| TYPE OF CHARACTER | CHARACTER | \multicolumn{5}{c|}{BIT NUMBER} |
| | | b_1 | ... | b_m |
| NUMERAL | 0 | 1 | ... | 1 |
| | 9 | 1 | ... | 1 |
| LOWER CASE ALPHABET | a | 1 | ... | 1 |
| | z | 0 | ... | 0 |
| UPPER CASE ALPHABET | A | 1 | ... | 1 |
| | Z | 1 | ... | 1 |
| HIRAGATA | あ | 1 | ... | 1 |
| | ん | 1 | ... | 1 |
| KATAKANA | ア | 1 | ... | 0 |
| | ン | 1 | ... | 1 |
| KANJI CHARACTER | 足 | 1 | ... | 0 |
| | 吾 | 0 | ... | 0 |

| CHARACTER APPEARANCE MAP (SINGLE CHARACTER) | | | | | | |
|---|---|---|---|---|---|---|
| TYPE OF CHARACTER | CHARACTER | \multicolumn{5}{c|}{BIT NUMBER} |
| | | b_1 | ... | b_m |
| NUMERAL | 0 | 1 | ... | 1 |
| | 9 | 1 | ... | 1 |
| LOWER CASE ALPHABET | a | 1 | ... | 1 |
| | z | 0 | ... | 0 |
| UPPER CASE ALPHABET | A | 1 | ... | 1 |
| | Z | 1 | ... | 1 |
| HIRAGATA | あ | 1 | ... | 1 |
| | ん | 1 | ... | 1 |
| KATAKANA | ア | 1 | ... | 0 |
| | ン | 1 | ... | 1 |
| KANJI CHARACTER | 足 | 1 | ... | 0 |
| | 吾 | 0 | ... | 0 |

APPARATUS FOR SEARCHING AND MANAGING COMPRESSED FILES

CROSS-REFERENCE TO RELATED APPLICATIONS

This application is based upon and claims the benefit of priority from the prior Japanese Patent Application No. 2008-143527, filed on May 30, 2008, the entire contents of which are incorporated herein by reference.

FIELD

The embodiments discussed herein are related to information search and management with respect to compressed files.

BACKGROUND

Conventionally, as disclosed in International Publication Pamphlet No. 2006-123448, a technique of reducing the number of files that are opened involves handling the files in a compressed format and strictly selecting files that have a potential of satisfying search conditions. In general, concerning file searches, the use of archives is accepted to be effective against the problems of fragmentation of storage areas and increased storage size, problems occurring because the number of times opening processes are executed increases and file management is executed for each sector.

However, with the archives above, the computation of a compression parameter is necessary because files are respectively compressed using different compression parameters. Consequently, a problem has arisen in that the time necessary for the opening processes increases overall. With the technique disclosed in International Publication Pamphlet No. 2006-123448 and with archives, a problem has arisen in that the percentage of the files for which the opening processes are performed drastically increases as the number of files to be searched increases. Particularly, for large-scale dictionaries, opening processes accounts for 20 to 30% of the entire file processing and consequently, a problem has arisen in that this becomes a factor in reducing the speed of a full text search. In addition, a problem has arisen in that 13 comparisons are necessary in a binary search to identify a designated file among approximately 5,000 files. Furthermore, fragmentation of the disc area occurs because file management is executed for each sector, arising in a problem of the storage size increasing.

Meanwhile, for a search in a dictionary on a system including a single server that includes a large-capacity main storage memory, the dictionary is divided into numerous files and numerous disc areas, requiring a very long time for opening processes and reading processes to cause the dictionary to reside in a cache, and fragmentation of the storage area occurs in the cache resulting in a problem of the storage size increasing.

In many dictionary searches using grid computing, the entire search process is affected when a search process of a grid computer is delayed causing reduced search efficiency.

SUMMARY

According to an aspect of an embodiment, a computer-readable recording medium stores therein an information searching program that causes a computer having access to archives including a compressed file group of compressed files that are to be searched and that have described therein character strings. The information searching program causes the computer to execute sorting the compressed files in descending order of access frequency of the compressed files; combining the compressed files in descending order of access frequency after the sorting at the sorting such that a storage capacity of a cache area for a storage area that stores therein the compressed file group is not exceeded by a combined size of the compressed files combined; and writing, from the storage area into the cache area, the compressed files combined at the combining, the compressed files combined being written prior to a search of the compressed files combined.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a schematic of a single-character appearance map M1;

FIG. 5 is a schematic of a consecutive-character appearance map;

FIG. 6 is a schematic of a compression parameter;

FIG. 7 is a schematic of a file path table;

FIG. 8 is a schematic of a character appearance map linking table;

FIG. 9 is a schematic of the file path linking table 212;

FIG. 10 is a schematic of a virtual archive capacity table;

FIG. 25 is a schematic of the single-character appearance map of the archives 200-1;

FIG. 26 is a schematic of the consecutive-character appearance map of the archives 200-1;

FIG. 27 is a schematic of the compression parameter of the archives 200-1;

FIG. 28 is a schematic of a file path table of the archives 200-1;

FIG. 29 is a schematic of a character appearance map linking table of the archives 200-1;

FIG. 30 is a schematic of a file path linking table of the archives 200-1;

FIG. 33 is a schematic of the consecutive-character appearance map of the archives 200-2;

FIG. 34 is a schematic of the compression parameter of the archives 200-2;

FIG. 35 is a schematic of a file path table 222b of the archives 200-2;

FIG. 36 is a schematic of a character appearance map linking table of the archives 200-2;

FIG. 37 is a schematic of a file path linking table of the archives 200-2;

FIG. 38 is a schematic for explaining an example of common parameter generation;

FIG. 39 is a schematic for explaining a reconfiguration of the character appearance map linking tables;

FIG. 40 is a schematic for explaining reconfiguration of the file path linking tables;

FIG. 41 is a schematic for explaining reconfiguration of the file path tables;

FIG. 42 is a schematic for explaining reconfiguration of the single-character appearance maps;

DESCRIPTION OF EMBODIMENT(S)

Preferred embodiments of the present invention will be explained with reference to the accompanying drawings.

In a narrow sense, archiving generally is a technique of consolidating multiple folders and numerous files of the folders, into one file. Archives are transmitted and received as email attachments, and are used for such purposes as data exchange. In a broad sense, archives are also introduced as an accessory technique of compression because often the archives are combined with a compressing technique. With the prevalence of the Internet, archiving technology advances and a wide variety of tools have been developed combining operability and compression schemes. The advancement of hardware such as a personal computer is remarkable and, especially, the increased speed of central processing units (CPUs) and the increased capacity of recording media such as a memory, a hard disc, and an optical disc are conspicuous.

With the advancement of hardware, the diversification of data and changes in, for example, practical applications of data such as for analysis, inquiries, and research are also remarkable. Conversely, concerning leaks of personal information and window-dressed accounting, the strengthening of security functions compliant with legislation such as the personal information protection law is demanded. Conventionally, archiving technology has focused on compression and expansion performance. However, from now on, functions linked to searching, security, etc. will be the focus.

Conventional archiving is technology developed mainly in the fields of data storage, information transmission, and information exchange and is characterized by compression and consolidation into one file. When a file is used, expansion (or temporary expansion) is executed. Archives such as ZIP have no full text search function. The search function becomes more important as the number of files increases.

According to a first embodiment, the time required for a file access process such as reading is reduced by causing a file having a high access frequency to reside in a cache memory when a full text search in a compressed file is implemented.

Figure 1:
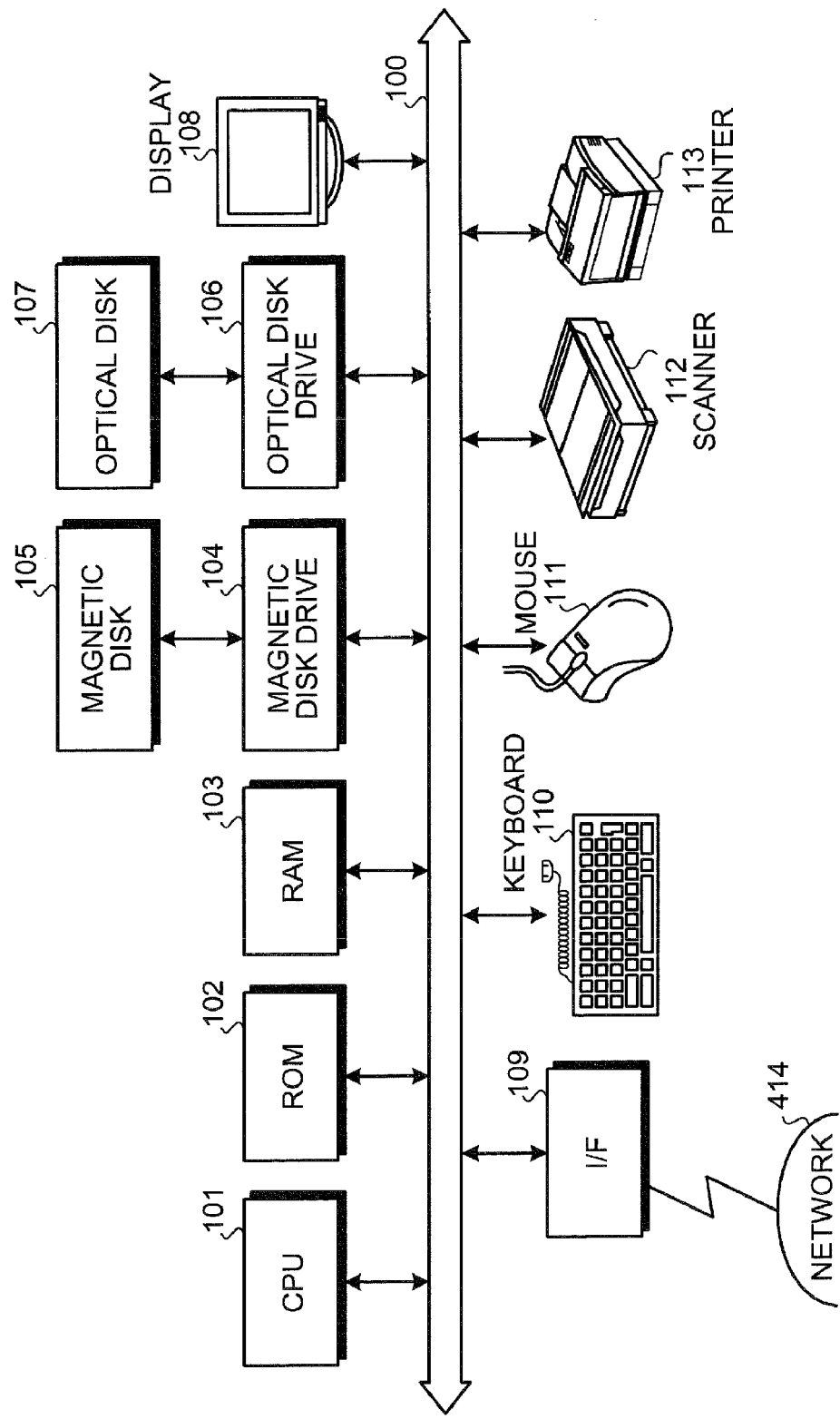
FIG. 1 is a block diagram of an information search apparatus according to a first embodiment.

FIG. 1 is a block diagram of an information search apparatus according to the first embodiment. As depicted in FIG. 1, the information search apparatus includes a central processing unit (CPU) 101, a read-only memory (ROM) 102, a random access memory (RAM) 103, a magnetic disc drive 104, a magnetic disc 105, a optical disc drive 106, a removable recording medium such an optical disc 107, a display 108, an interface (I/F) 109, a keyboard 110, a mouse 111, a scanner 112, and a printer 113, connected to one another by way of a bus 100.

The CPU 101 governs overall control of the information search apparatus. The ROM 102 stores therein programs such as a boot program. The RAM 103 is used as a work area of the CPU 101. The magnetic disc drive 104, under the control of the CPU 101, controls reading/writing of data from/to the magnetic disc 105. The magnetic disc 105 stores therein the data written under control of the magnetic disc drive 104.

The optical disc drive 106, under the control of the CPU 101, controls reading/writing of data from/to the optical disc 107. The optical disc 107 stores therein the data written under control of the optical disc drive 106, the data being read by a computer.

The display 108 displays a cursor, an icon, a tool box, and data such as document, image, and function information. The display 108 may be, for example, a cathode ray tube (CRT), a thin-film-transistor (TFT) liquid crystal display, or a plasma display.

The I/F 109 is connected to a network 114 such as a local area network (LAN), a wide area network (WAN), and the Internet through a communications line and is connected to other devices by way of the network 114. The I/F 109 manages the network 114 and an internal interface, and controls the input and output of data from and to external devices. The I/F 109 may be, for example, a modem or a local area network (LAN) adapter.

The keyboard 110 is equipped with keys for the input of characters, numerals, and various instructions, and data is entered through the keyboard 110. The keyboard 110 may be a touch-panel input pad or a numeric keypad. The mouse 111 performs cursor movement, range selection, and movement, size change, etc., of a window. The mouse 111 may be a trackball or a joystick provided the trackball or joystick has similar functions as a pointing device.

The scanner 112 optically reads an image and takes in the image data into the information search apparatus. The scanner 112 may have an optical character recognition (OCR) function. The printer 113 prints image data and document data. The printer 113 may be, for example, a laser printer or an ink jet printer.

Figure 2:
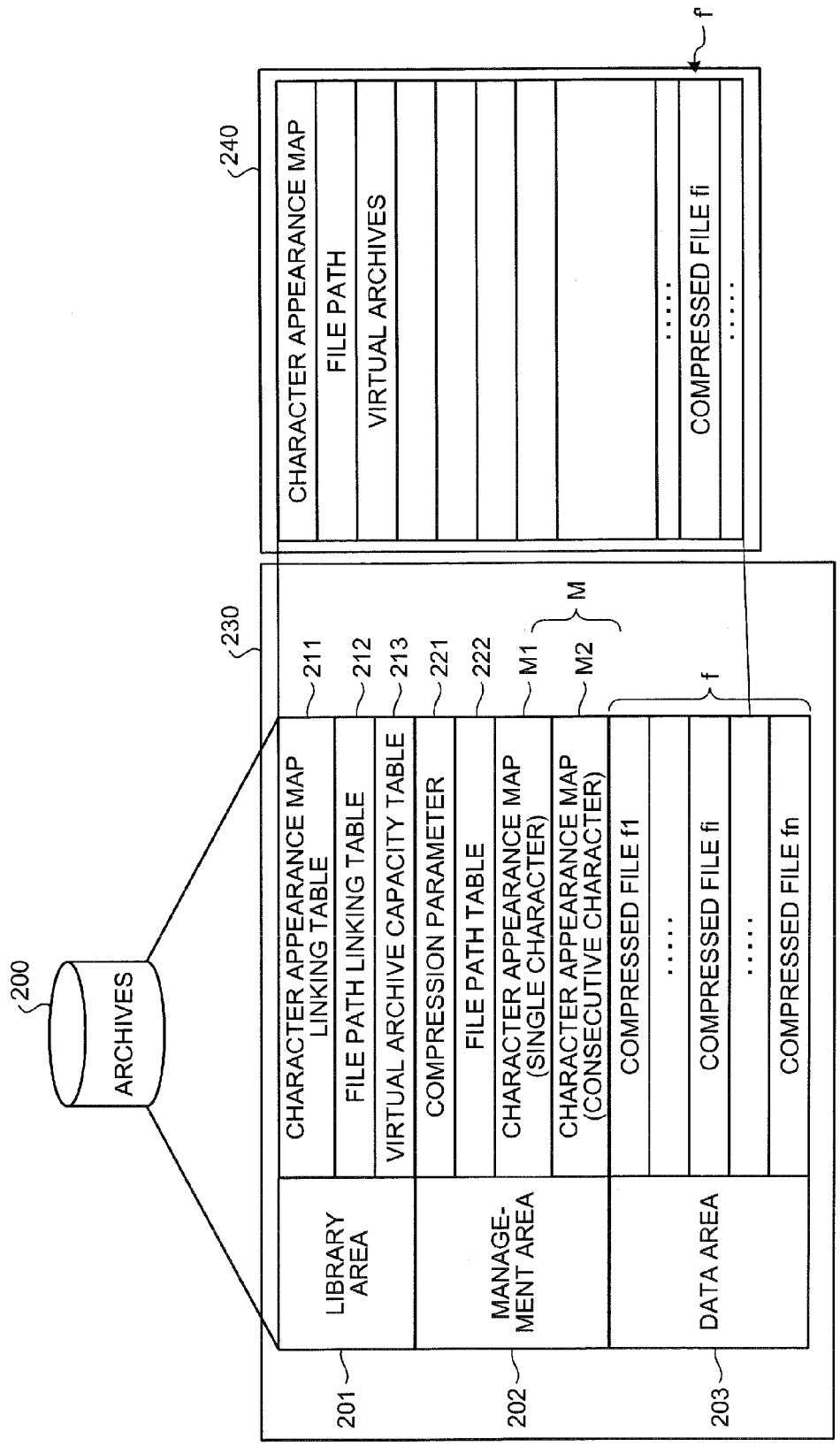
FIG. 2 is a schematic depicting stored content of archives.

FIG. 2 is a schematic depicting stored contents of archives. The archives are stored in a storage area such as the RAM 103 or the magnetic disc 105 depicted in FIG. 1. Archives 200 include a library area 201, a management area 202, and a data area 203. The library area 201 stores therein a character appearance map linking table 211, a file path linking table 212, and a virtual archive capacity table 213. The management area 202 stores therein a compression parameter 221, a file path table 222, and a character appearance map M (a single-character appearance map M1 and a consecutive-character appearance map M2). The data area 203 stores therein a compressed file group f (compressed files f1 to fn).

The archives 200 are stored in the storage area 230 and compressed files from the head to a compressed file f' are stored in a cache area 240. In this example, the cache area 240 is a storage area 230 that is determined relative to the storage area 230 of the archives 200 and that is an area capable of being accessed at a higher speed than the storage area 230 of the archives 200. For example, when the storage area 230 of the archives 200 is the magnetic disc 105, the cache area 240 is provided on a main memory heap area, etc. The cache area further stores therein some or all of character appearance maps, file paths, and virtual archives.

Figure 3:
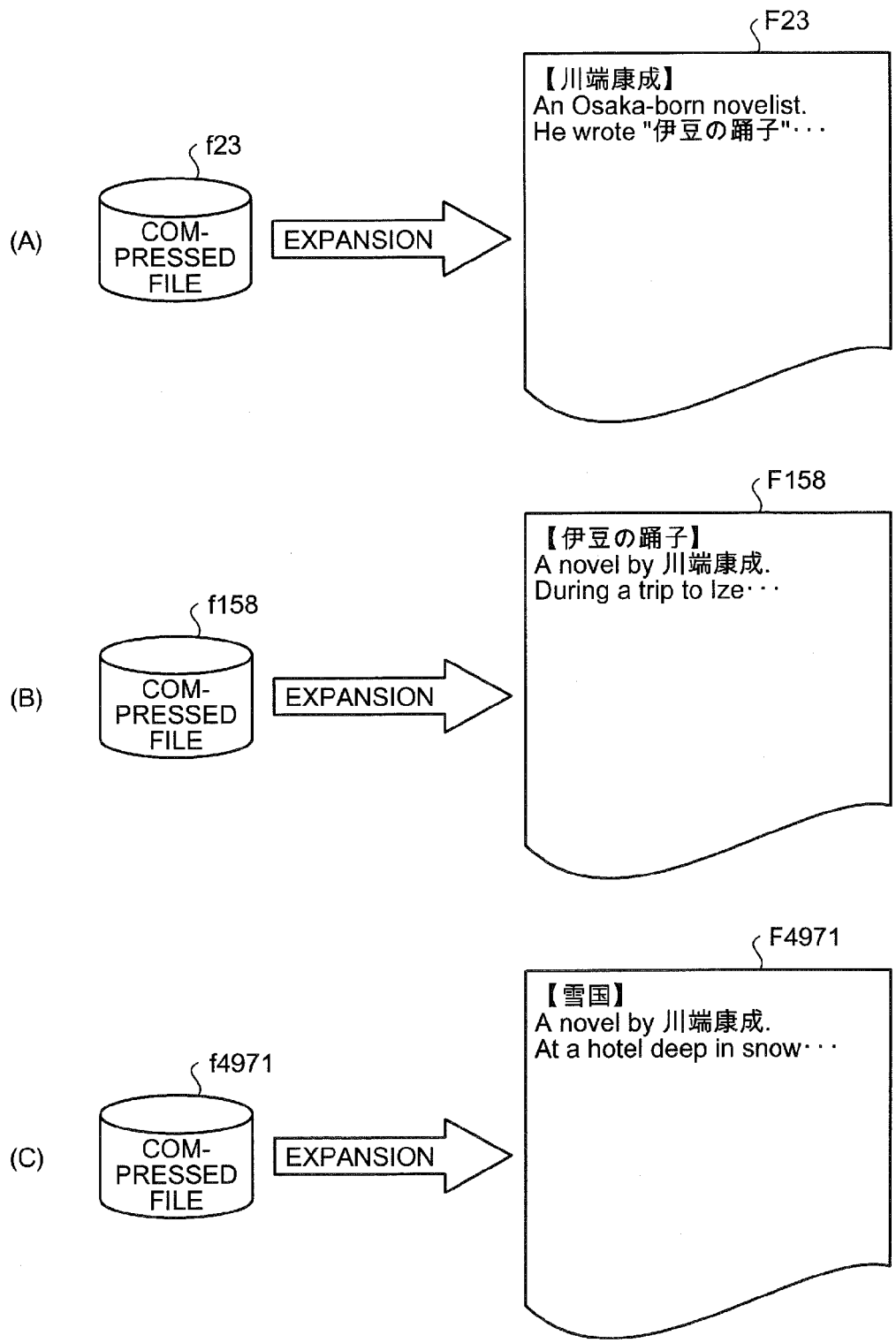
FIG. 3 is a schematic for explaining relations between a compressed file and files to be searched.

FIG. 3 is a schematic for explaining relations between a compressed file fi and files to be searched. "n" compressed files f1 to fn are compressed using a common Huffman tree and are expanded using the Huffman tree. The expanded file group to be searched is a file group that has described therein, for example character strings such as a dictionary or a glossary. Each file is described in a computer readable language such as HyperText Markup Language (HTML) or Extensible Markup Language (XML). For a Japanese dictionary, the number of characters in one file may be 4,000 or more and the number of files "n" is on the order of n=4,000 to 6,000.

For example, concerning a Japanese dictionary, when a compressed file f23 having a file number of i=23 is expanded, a file F23 to be searched is obtained as depicted in section (A) of FIG. 3; when a compressed file f158 having a file number of i=158 is expanded, a file F158 to be searched is obtained as depicted in section (B) of FIG. 3; and, when a compressed file f4971 having a file number of i=4971 is expanded, a file F4971 to be searched is obtained as depicted in section (C) of FIG. 3. In the files F23, F158, and F4971 to be searched, character strings within thick brackets are headwords.

FIG. 4 is a schematic of the single-character appearance map M1. The single-character appearance map M1 includes a bit row for each character. Bits in the bit row are arranged sequentially according to bit number. A bit number "i" corresponds to a file number "i" of a compressed file. In the bit row, "1" indicates that a given character is present and "0" indicates that the given character is not present. For example, a bit number i=1 for a Hiragana character "あ" is "1" and therefore, the Hiragana character "あ" is present in a file that is to be searched and formed by an expansion of the compressed file f1. On the other hand, a bit number i=1 for a Kanji character "足" is "0" and therefore, the Kanji character "足" is not present in a file that is to be searched and formed by an expansion of the compressed file f1.

FIG. 5 is a schematic of the consecutive-character appearance map M2. Consecutive characters are a string of characters. In the example, two consecutive characters are exemplified; however, three or more consecutive characters may be employed. The map format is identical to that of the single-character appearance map M1 depicted in FIG. 4. For example, a bit number i=1 for consecutive numerals "99" is "0" and therefore, the consecutive numerals "99" are not present in a file that is to be searched and formed by an expansion of the compressed file f1. On the other hand, a bit number i=2 for the consecutive numerals "99" is "1" and therefore, the consecutive numerals "99" are present in a file that is to be searched and formed by an expansion of the compressed file f2.

FIG. 6 is a schematic of the compression parameter 221. The compression parameter 221 is a table correlating characters/consecutive characters described in a file group to be searched and formed by expanding a compressed file group f, with the frequency of appearance of each character. According to the compression parameter 221, a Huffman tree is generated to compress the file group to be searched into the compressed file group f.

FIG. 7 is a schematic of the file path table 222. The file path table 222 includes description of a path (file path) to the compressed file fi. More specifically, for example, for each file ID, the table 222 correlates a file path to a compressed file fi, the headword described in the file that is to be searched and formed by expanding the compressed file fi, the address of the compressed file fi, and the size of the compressed file fi. A file ID is information that uniquely identifies a compressed file fi.

For explanatory purposes, a reference symbol allocated to a compressed file is a "file ID". For example, a file path of a compressed file f23 having a file ID of "f23" is "honmon\file 23.html" having a headword of "川端康成" (see FIG. 3). When a resident flag described hereinafter is set to be "1", a file path to the cache area 240 (for example, "cash\file23.html") is written and, when the flag is returned to "0", the file path to the cache area 240 is deleted.

FIG. 8 is a schematic of the character appearance map linking table 211. The character appearance map linking table 211 includes the address, the size, the access frequency, and the resident flag for each bit in the bit row of each character in the character appearance map M. The "address" is an address indicative of the area in which a given compressed file corresponding to a given bit number in a bit row on the character appearance map M is stored. The "size" is the size of a given compressed file. For example, a compressed file that corresponds to the bit number "i" is the compressed file fi. The address at which this compressed file fi is stored is "adri" and the size of the compressed file fi is "si".

The "access frequency" is the degree to which the compressed file fi corresponding to the bit number i is accessed and, in the embodiment, the "access frequency" is the number of accesses. In addition to "the number of accesses", the access frequency may be represented by probability (the number of accesses of the compressed file fi/the total number of accesses of all the compressed files). The "resident flag" is a flag that indicates whether the compressed file fi corresponding to the bit number i resides in the cache area 240 resulting from the compressed file fi being moved from the storage are 230 of the archives 200 to the cache area 240 for the storage area 230.

When the compressed file fi resides in the cache area 240, the resident flag is "1". On the other hand, when the compressed file fi does not reside in the cache area 240 and is stored in the storage area 230, the resident flag is "0". When the resident flag is set to be "1", the address of the cache area 240 is written into the "Address" column and, when the resident flag is returned to "0", the address of the cache area 240 is deleted.

FIG. 9 is a schematic of the file path linking table 212. The file path linking table 212 is a table that links a file path and the bit number i. When the resident flag is set to be "1", the file path to the cache area 240 is written and, when the resident flag is returned to "0", the file path to the cache area 240 is deleted.

FIG. 10 is a schematic of the virtual archive capacity table 213. The virtual archives include the compressed file group f' stored in the cache area 240 of the archives 200 stored in the storage area 230. Tables, etc., in the library area 201 and the management area 220 may be included in the virtual archives.

Figures 11, 12:
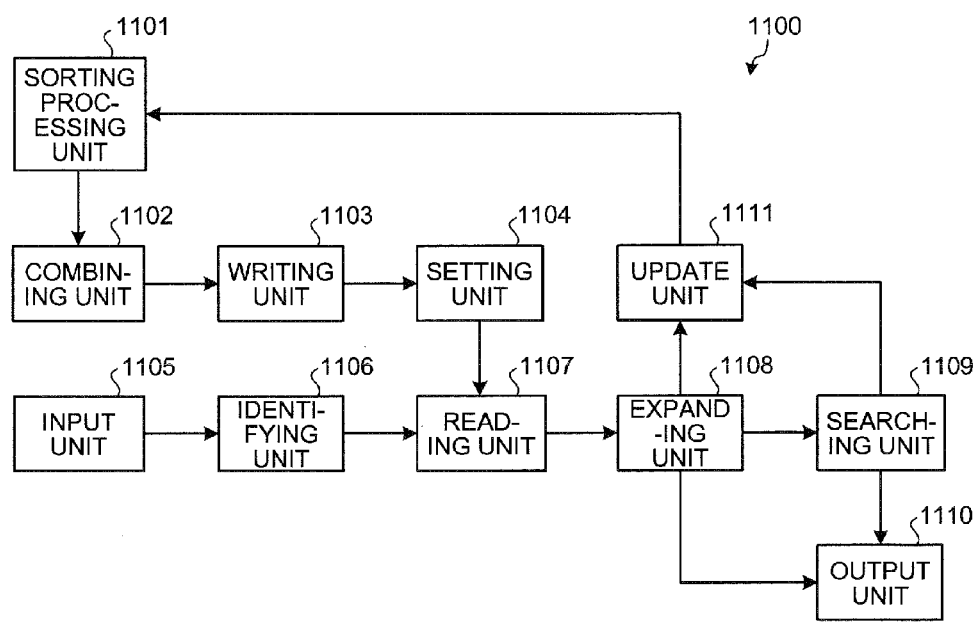
FIG. 11 is a block diagram of a functional configuration of an information searching apparatus.
FIG. 12 is a schematic of an example of strict selection of the compressed file using the character appearance map.

FIG. 11 is a block diagram of a functional configuration of an information searching apparatus. An information searching apparatus 1100 includes a sorting processing unit 1101, a combining unit 1102, a writing unit 1103, a setting unit 1104, an input unit 1105, an identifying unit 1106, a reading unit 1107, an expanding unit 1108, a searching unit 1109, an output unit 1110, and an updating unit 1111.

Units including the sorting unit 1101 to the input unit 1105 and the updating unit 1111 implement a virtual archive setting function. Units including the input unit 1105 to the output unit 1110 implement an information searching function. The International Publication No. 2006-123448 describes in detail an information searching function, attributes characterizing the function according to the present embodiment are briefly described.

More specifically, functions of the sorting processing unit 1101 to the updating unit 1111 are implemented by, for example, causing the CPU 101 to execute a program stored in the storage area 230 such as the ROM 102, the RAM 103, and the magnetic disc 105 depicted in FIG. 1, or by the I/F 109.

The sorting processing unit 1101 has a function of sorting the compressed files in the character appearance map linking table 211 in descending order of the access frequency of each compressed file. This sorting is a process executed before setting the resident flag.

The combining unit 1102 has a function of combining, in terms of size, the compressed files fi in descending order of access frequency after the sorting by the sorting processing unit 1101. More specifically, the combination is executed such that the storage capacity of the cache area 240 for the storage area 230 that stores therein the compressed file group f is not exceeded. For example, the compressed files are combined in descending order of the access frequency after the sorting by the sorting processing unit 1101 such that the combined size is the largest combined size that does not exceed the storage capacity of the cache area 240. By calculating the greatest combined value in this manner, the storage capacity of the cache area 240 can be fully utilized.

The writing unit 1103 has a function of writing the compressed file group combined by the combining unit 1102 from the storage area 230 into the cache area 240, prior to a search of the file group. The compressed file group f to be written into the cache area 240 may be deleted from the storage area 230 or may remain in the storage area 230. In this manner, by writing the compressed file group having a high access frequency into the cache area 240, a faster file access speed can be achieved.

The setting unit 1104 has a function of setting the resident flag for the compressed file group written into the cache area 240 by the writing unit 1103. More specifically, for example, the resident flag of the compressed file group written in the cache area 240 in the character appearance map linking table 211 is changed from "0" to "1". When the resident flag is already "1", the flag is not changed. For a compressed file that was written into the cache area 240 the previous time and is deleted this time, the resident flag that had been set to "1" is changed to "0". Thereby, a compressed file having a high access frequency and residing in the cache area 240 can be identified.

The input unit 1105 has a function of receiving input of a search character string. More specifically, the input unit 1105 receives a search character string input through the use of an input apparatus such as the keyboard depicted in FIG. 1. For example, the input unit 1105 receives input of a search character string such as "川端康成". In addition to search character strings, the input unit 1105 may receive input of search conditions such as forward coincidence and reverse coincidence.

The identifying unit 1106 has a function of identifying a compressed file that includes all the characters included the search character string received by the input unit 1105. More specifically, by referring to the character appearance map M, the compressed file group is strictly selected and compressed files having therein all the characters constituting the search character string are obtained. For example, when the search character string is "川端康成", the string is disassembled into single characters of "川", "端", "康", and "成". Logical multiplication is performed with respect to the bit rows of the single characters "川", "端", "康", and "成" from the single-character appearance map M1 and thereby, narrowing down compressed files to be searched to the compressed files corresponding to bit numbers for which the result of the computing by logical multiplication is "1" (strict selection).

FIG. 12 is a schematic of an example of strict selection of the compressed file fi using the character appearance map M. As depicted in FIG. 12, for each bit number among the bit rows for the characters "川", "端", "康", and "成", a logical product is computed by logical multiplication (AND). Thus, it is known that all of the single characters "川", "端", "康", and "成"are included in the files compressed into the compressed files f1, f23, f158, and f4971, respectively corresponding to the bit numbers i=1, 23, 158, and 4971 and each having a logic product of "1."

Although, at this stage, it is only known that the files include all of the single characters "川", "端", "康", and "成", and not whether the single characters "川", "端", "成", and "成" are included sequentially as a character string, a compressed file that may include the search character string can be identified while the file is in a compressed format.

The reading unit 1107 has a function of reading, from an area based on the resident flag set by the setting unit 1104, the compressed file identified by the identifying unit 1106. More specifically, for example, by referencing the resident flag in the character appearance map linking table 211, the area storing therein the identified compressed file is identified based on the value of the resident flag.

When the resident flag is "0", the compressed file is not stored in the cache area 240 and is read from the storage area of the archives 200. In an opening process based on a common file name, the file path table is referenced and the corresponding compressed file fi is opened based on the head address and the size of a file ID that coincide in the binary search. With archives that have many compressed files stored therein, the time for the opening process becomes long.

On the other hand, in an opening process based on the bit number in the character appearance map, the character appearance map 211 is referenced and, the head address and the size corresponding to the bit number can be obtained. Thus, the corresponding compressed file fi can be accessed at a high speed. When the resident flag is "1", it is known that the file is stored in the cache area 240. Hence, the compressed file fi is accessible from the cache area 240, thereby further increasing the speed.

The expanding unit 1108 has a function of expanding a compressed file read by the reading unit 1107. More specifically, for example, the read compressed file fi is expanded using the Huffman tree generated based on the compression parameter 221. Consequently, the read compressed file fi only has to be expanded and therefore, the speed of file accesses can be increased.

The searching unit 1109 has a function of searching the file expanded by the expanding unit 1108 for a character string that coincides with or is related to a search character string. More specifically, for example, a file to be searched having therein a character string that coincides with the search character string is extracted from the file group that is to be searched and whose files have been expanded. A file to be searched having a character string that includes the search character string in forward coincidence or reverse coincidence is extracted as a related file to be searched. In addition, when a character string co-occurring with the search character string is set, the file to be searched including the co-occurring character string is extracted as a related file to be searched.

The output unit 1110 has a function of outputting a file to be searched that has been expanded by the expanding unit 1108. More specifically, the form of output from the output unit 1110 may be, for example, display on a display, output by printing by a printer, transmission to another computer, and storage in the storage area 230 of the information searching apparatus 1100. When the output is displayed on a display, the expanded files to be searched may be displayed. Alternatively, the names of the expanded files to be searched may be displayed in a list and a user may select the name of one of the expanded files to be searched and the linked file to be searched may be read and displayed on a screen.

When the search is executed by the searching unit 1109, the retrieved file to be searched may be displayed. Alternatively, the names of the retrieved files to be searched may be displayed in a list and a user may select the name of one of the files to be searched and the linked file to be searched may be read and displayed on a screen.

The updating unit 1111 has a function of updating the access frequency of the compressed file when the compressed file is expanded by the expanding unit 1108. More specifically, for example, when the access frequency is expressed by the number of accesses, one is added to the number of accesses of the compressed file fi that has been expanded. When the access frequency is expressed by probability, one is added to the number of accesses of the expanded file and one is also added to the total number of accesses made to the compressed files f1 to fn.

On the other hand, for the compressed file fi that is not expanded, only the total number of accesses made to the compressed files f1 to fn is incremented by one. Therefore, the sorting processing unit 1101 executes the sorting process according to the access frequency of the compressed file group f after the frequency is updated. Thus, the access frequency of the compressed file fi that tends to be strictly selected based on the character appearance map M increases, thereby enabling a faster expansion speed to be realized at subsequent expansions.

The updating unit 1111 may update the access frequency for the compressed file fi retrieved by the searching unit 1109 and not for the compressed file fi that has been expanded by the expanding unit 1108. More specifically, for example, when the access frequency is expressed by the number of accesses, one is added to the number of accesses of the compressed file fi including a file to be searched that has been retrieved. When the access frequency is expressed by probability, one is added to the number of accesses of the compressed file fi including a file to be searched that has been retrieved, and one is also added to the total number of accesses made to the compressed files f1 to fn.

On the other hand, for the compressed file fi of the files to be searched that is not retrieved, one is added only to the total number of accesses made to the compressed files f1 to fn. Therefore, the sorting processing unit 1101 executes the sorting process according to the access frequency of the compressed file group after the frequency is updated. Thereby, the access frequency of the compressed file fi that is actually searched is increased and, therefore a faster searching speed can be realized at subsequent searches.

Figure 13:
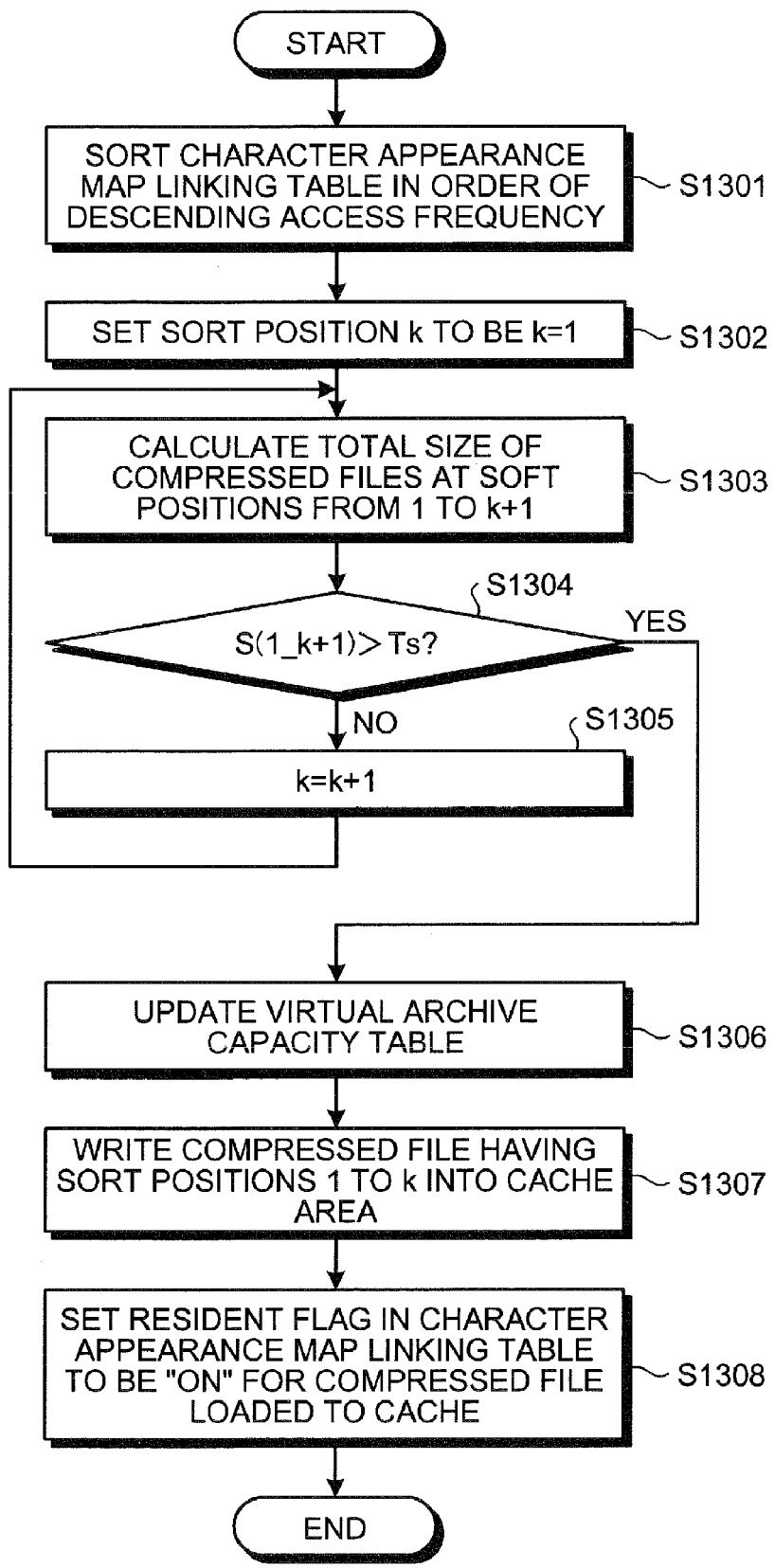
FIG. 13 is a flowchart of a virtual archives setting process.

FIG. 13 is a flowchart of a virtual archives setting process executed by a virtual archive setting function of the information searching apparatus 1100. The sorting processing unit 1101 sorts the compressed files in the character appearance map linking table 211 in descending order of access frequency (step S1301). Here, a sort position "k", after the sorting is set to be k=1 (step S1302) and the combining unit 1102 calculates the total size of the compressed files having the sort positions 1 to k+1 (step S1303). Whether the total size "s(1_k+1)" is s(1_k+1)>Ts is judged (step S1304). In this example, "Ts" is the maximum storage capacity of the cache area 240.

When s(1_k+1) is not s(1_k+1)>Ts (step S1304: NO), k is incremented (step S1305) and the procedure returns to step S1303. On the other hand, when s(1_k+1) is s(1_k+1)>Ts (step S1304: YES), because no more compressed files can be stored in the cache area 240, the virtual archive capacity table 213 is updated such that the bit numbers, the access frequencies, and the sizes are those of the compressed files having the sort positions 1 to k+1 (step S1306).

The writing unit 1103 writes the compressed files having the sort positions 1 to k into the cache area 240 (step S1307). In the example, the compressed files having sort positions after k are deleted from the cache area 240. Subsequently, the setting unit 1104 sets the resident flags of the compressed files having the sort positions 1 to k in the character appearance map linking table 211 to be "ON" (from "0" to "1") (step S1308).

For each of the compressed files having sort positions after k, the resident flag is set to be "OFF" (from "1" to "0"), ending a series of processing. According to the virtual archives setting process, prior to a search, compressed files each having a high access frequency can be set preferentially as the virtual archives and therefore, a faster file accessing speed can be realized.

Figure 14:
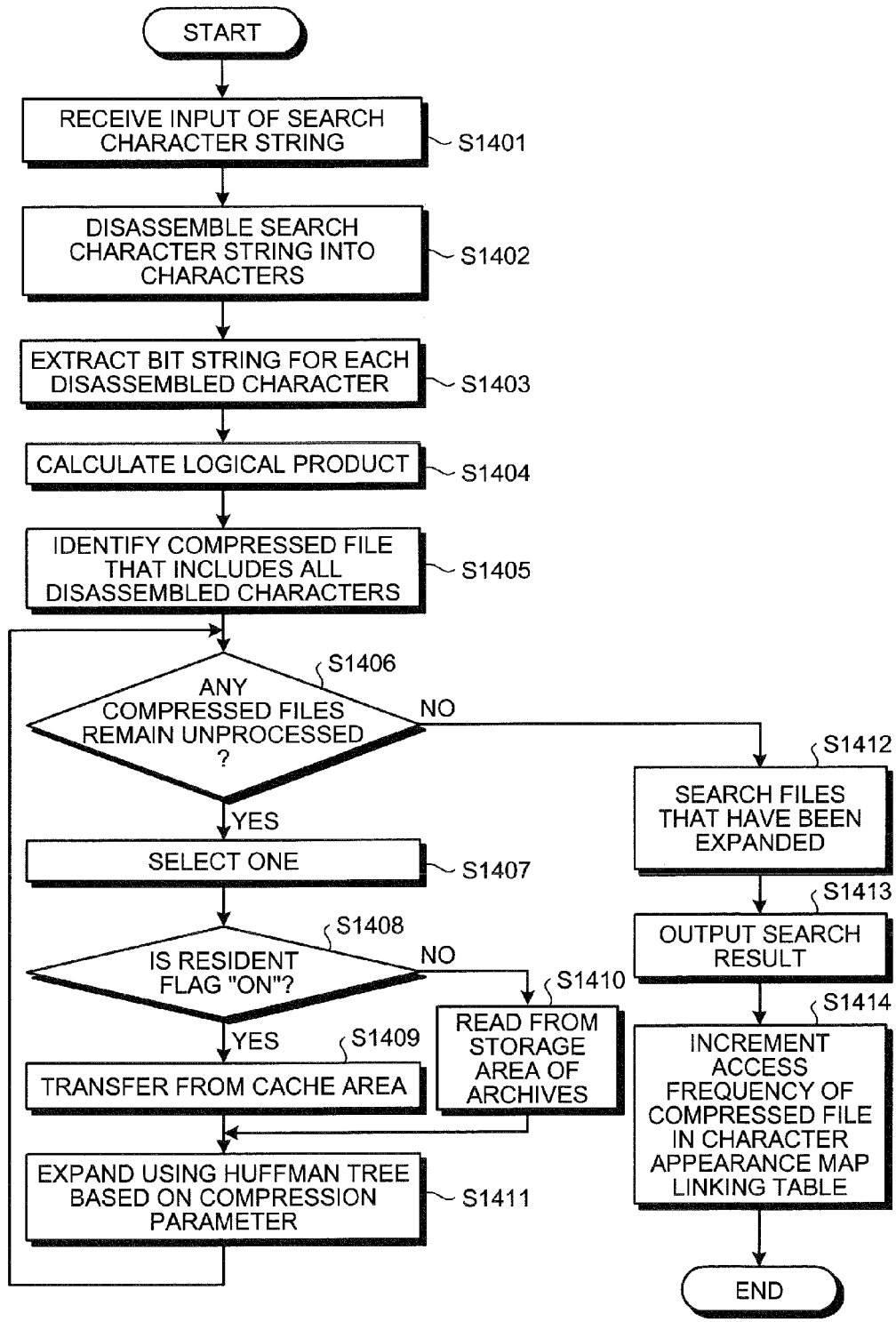
FIG. 14 is a flowchart of an information search process.

FIG. 14 is a flowchart of an information search process executed by an information searching function of the information searching apparatus 1100. The input unit 1105 receives input of a search character string (step S1401). The search character string is disassembled into single characters or consecutive characters (hereinafter, "character") (step S1402). The bit row for each disassembled character is extracted from the character appearance map M (step S1403) and for each bit number among the extracted bit rows, a logical product is computed by logical multiplication (step S1404).

The compressed files fi having logical products of "1" as a result of the computing are identified as compressed files that include the disassembled characters (step S1405). Subsequently, whether unprocessed compressed files fi among the identified compressed files fi are present is judged (step S1406). When an unprocessed compressed file fi is present (step S1406: YES), an unprocessed compressed file fi is selected (step S1407) and whether the resident flag is "ON" for the selected compressed file fi is judged (step S1408).

When the resident flag is "ON" (step S1408: YES), the reading unit 1107 transfers the selected compressed file fi directly from the cache area 240 to a register of the CPU 101 (step S1409) and the procedure advances to step S1411. On the other hand, When the resident flag is "OFF" (step S1408: NO), the reading unit 1107 reads the selected compressed file fi from the storage area 230 of the archives 200 to the cache area 240 and causes the CPU 101 to read this file, and the procedure advances to step S1411 (step S1410). At step S1411, the expanding unit 1108 executes an expansion process using the Huffman tree based on the compression parameter 221 (step S1411) and the procedure returns to step S1406.

At step S1406, when no unprocessed compressed files fi are present (step S1406: NO), the searching unit 1109 searches the expanded files using the search character string (step S1412). The output unit 1110 outputs the result of the search (step S1413). Subsequently, the updating unit 1111 adds one to the access frequency of the corresponding compressed file fi in the character appearance map linking table 211 (step S1414), and a series of processing ends.

According to the information search process, the compressed file fi whose resident flag is set to be "ON" ("1") is read from the cache area 240 and the expansion process is executed. Therefore, a faster file accessing speed can be realized. Because the access frequency for the compressed file fi is updated each time a search is executed, the compressed file fi written in the cache area 240 can be updated one by one. Therefore, a faster file accessing speed can be realized at subsequent accesses.

As described above, according to the first embodiment, in accessing the compressed file fi in the archives, a faster speed can be achieved by using the character appearance map linking table 211 based on the bit number in the character appearance map. Files can be accessed in less time by placing files having a high access frequency in the cache memory. Therefore, expansion can be completed in significantly less time and a faster search speed can be achieved. Saving of the memory can be realized by effectively using the cache area. The information searching apparatus 1100 of the first embodiment is applicable to a portable terminal such as a portable telephone, a portable game apparatus, and an electronic dictionary in addition to a personal computer and a search server.

A second embodiment will be described. For a site search on the Internet, updating of each site is regularly monitored; a large-scale index is generated based on the summarized data to which morphological analysis is executed; and a full text search is executed. With respect to increases in the amount of data of a site, conventionally, increasing the speed of the monitoring process for each site and increasing throughput, and the scalability of searches by multiple computers are problems.

With respect to such problems, the second embodiment realizes faster speeds of addition, merger, and deletion of the archives 200. For the scalability concerning grid computers, etc., the second embodiment realizes increased efficiency of the searching speed by dividing a search among slave servers and executing parallel processing, and by substantially equalizing the operating rate of each slave server.

Figure 15:
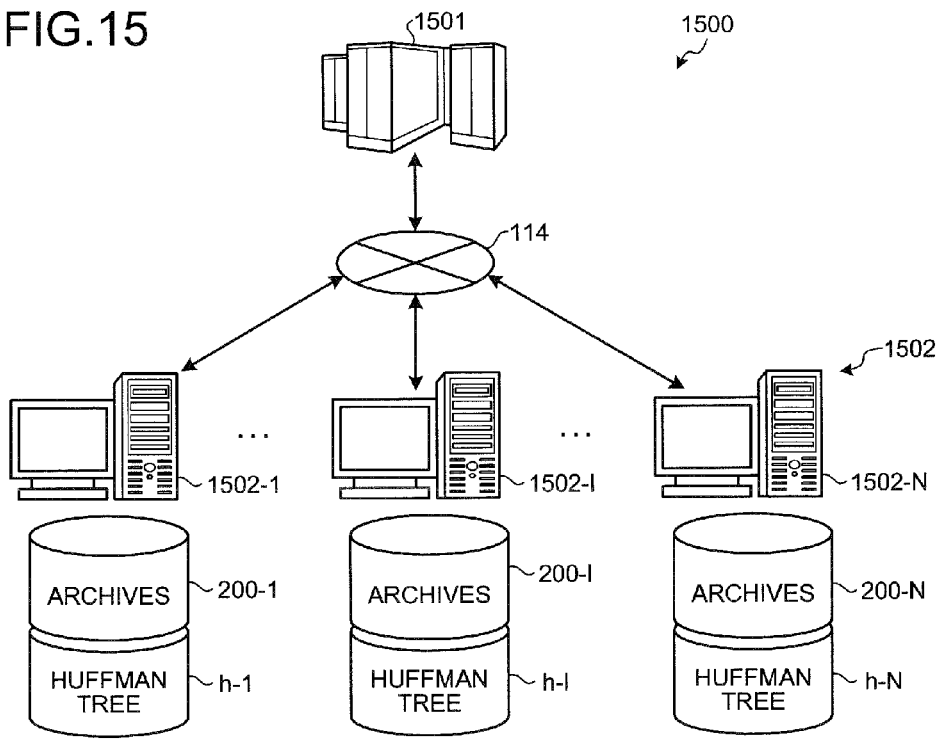
FIG. 15 is a schematic of a system configuration of a searching system according to a second embodiment.

FIG. 15 is a schematic of a system configuration of a searching system according to the second embodiment. A searching system 1500 includes a master server 1501 and slave servers 1502-1 to 1502-N. The master server 1501 and each of the slave servers 1502-1 to 1502-N, or the slave servers 1502-1 to 1502-N are mutually communicable through the network 114. The master server 1501 supervises and manages the slave servers 1502-1 to 1502-N. Each slave server 1502-I corresponds to the information searching apparatus 1100 of the first embodiment and a slave server 1502-I has the virtual archive setting function and the information searching function.

The type of the archives 200 included in each slave server 1502-I (I=1 to N) differs. For example, archives 200-I retained by a slave server 1502-I are archives of a Japanese dictionary; archives 200-J (J≠I) retained by a slave server 1502-J are archives of a glossary; and archives 200-K (K≠I, J) retained by a slave server 1502-K are archives of a English-Japanese dictionary, and similarly, the types and the publishing companies differ among the sets of archives.

Each slave server 1502-I has archives 200-I that differ as well as a compression parameter 221-I in the archives 200-I also differs among the slave servers 1502-I. Therefore, a Huffman tree h-I retained in each slave server 1502-I has a structure that also differs.

A multi-book search that is referred to as "meta-search" is executed with respect to the slave server group 1502 above by providing a common search keyword from the master server 1501. Each slave server 1502-I returns the search result to the master server 1501 and thereby, the master server 1501 is able to obtain a search result from multiple dictionaries. Hereinafter, for simplicity of description, it is assumed in the description that the number of the slave servers 1502-I is two (N=2).

Figure 16:
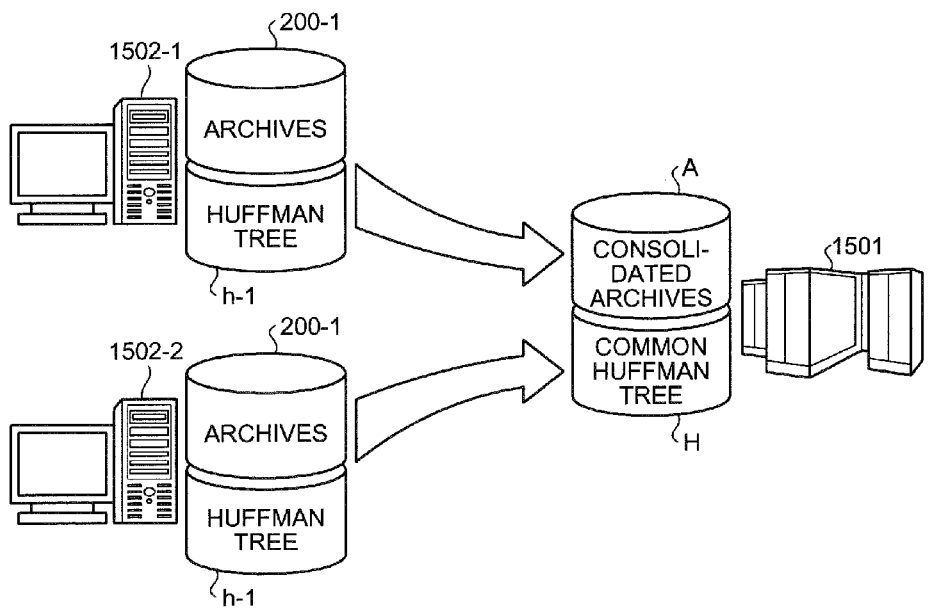
FIG. 16 is a schematic for describing a sharing of archives.

FIG. 16 is a schematic for describing a sharing of archives. To substantially equalize the search processes in each of the slave servers 1502-1 and 1502-2, the master server 1501 collects the sets of archives 200-1 and 200-2 of the slave servers 1502-1 and 1502-2, and Huffman trees h-1 and h-2 through the network 114. Integrated archives A formed by aggregating the sets of archives 200-1 and 200-2, and a common Huffman tree formed by making the Huffman trees h-1 and h-2 in archives 200-1 and 200-2 common are generated.

Figures 17, 18:
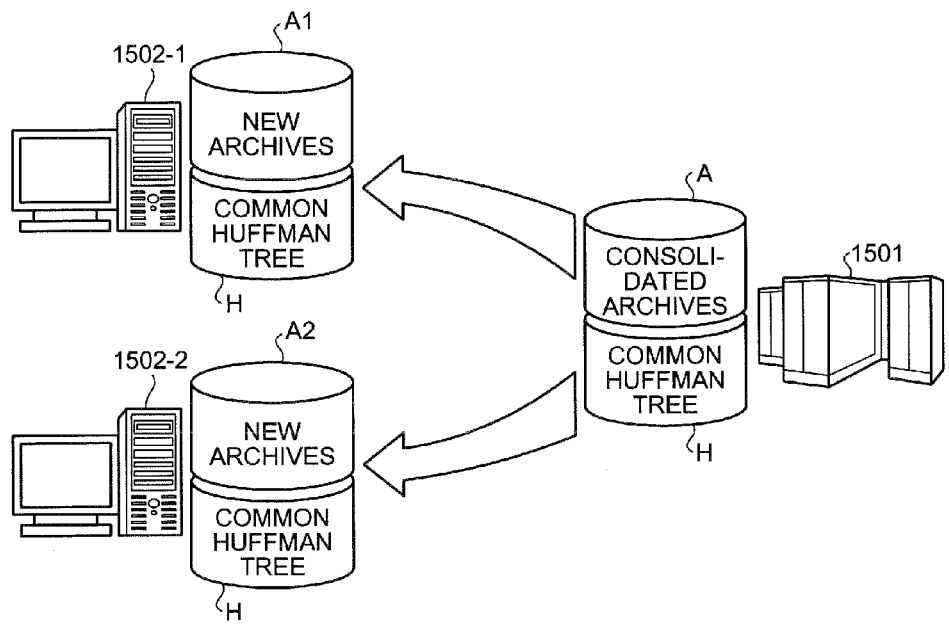
FIG. 17 is a schematic for describing an allocation process for new archives.
FIG. 18 is a schematic of a compression symbol table and the compression parameter of archives 200-1.

FIG. 17 is a schematic for describing an allocation process for new archives. The master server 1501 divides the integrated archives A and transmits the divided sets of archives to the slave servers 1502-1 and 1502-2 as sets of new archives A1 and A2 respectively specific to slave servers 1502-1 and 1502-2 such that the search processes of the slave servers 1502-1 and 1502-2 are substantially equalized. New common Huffman trees H1 and H2 are transmitted respectively to the slave servers 1502-1 and 1502-2. In the example, one set of archives is allocated to one slave server and therefore, the common Huffman tree H is transmitted to the slave servers 1502-1 and 1502-2. However, when plural sets of archives and respective Huffman trees are present for each slave server, a common Huffman tree specific to each slave server is transmitted to the slave server. For example, when the archives 200-1 and 200-2 and the Huffman trees h-1 and h-2 are present in the slave server 1501-1, the common Huffman tree H is transmitted to the slave server 1502-1.

FIG. 18 is a schematic of a compression symbol table and the compression parameter 221 of the archives 200-1. In FIG. 18, for simplicity of description, characters "a" to "f" are described in a file group that is to be searched, is compressed, and is in the archives 200-1. In FIG. 18, section (A) depicts a compression symbol table 1800 of the archives 200-1 and section (B) depicts a compression parameter P1 of the archives 200-1. In the compression symbol table 1800, a shorter compression symbol is allocated to a character having a larger frequency of appearance.

Figures 19, 20:
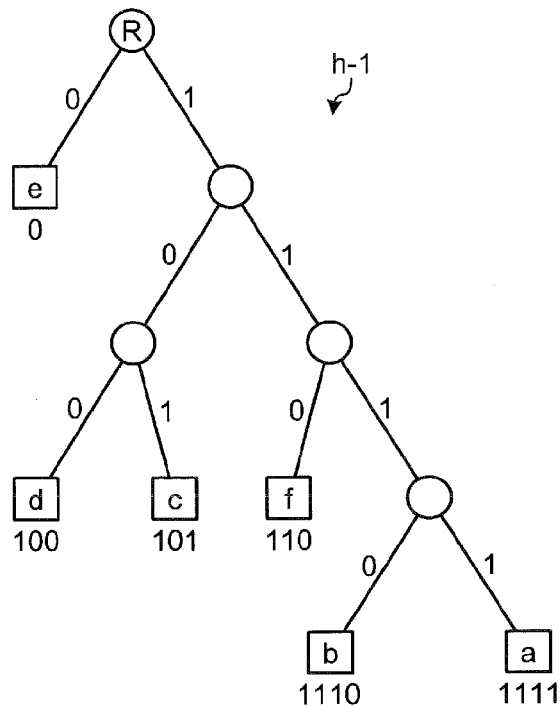
FIG. 19 is a schematic of a Huffman tree generated from the compression symbol table of the archives 200-1.
FIG. 20 is a schematic of a compression symbol table and the compression parameter of archives.

FIG. 19 is a schematic of the Huffman tree h-1 generated from the compression symbol table 1800 of the archives 200-1. In FIG. 19, a circle is a node. The highest sort position node is referred to as "root R" and other nodes are referred to as "internal nodes". A square is a leaf. A line connecting nodes or a node and a leaf is a branch. A character depicted within a leaf is a character obtained after expansion. A character string depicted below a leaf is the compression symbol allocated to the character obtained after expansion indicated in the leaf.

Figures 21, 22:
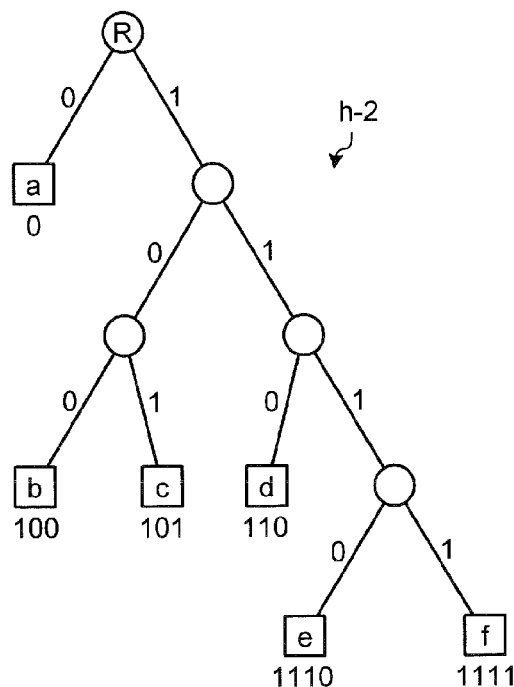
FIG. 21 is a schematic of the Huffman tree generated from the compression symbol table of the archives 200-2.
FIG. 22 is a schematic of a compression symbol table and the compression parameter of integrated archives.

FIG. 20 is a schematic of a compression symbol table and the compression parameter 221 of the archives 200-2. In FIG. 20, for simplicity of description, characters "a" to "f" are described in a file group that is to be searched, is compressed, and is in the archives 200-2. In FIG. 20, section (A) depicts a compression symbol table 2000 of the archives 200-2 and section (B) depicts a compression parameter P2 of the archives 200-2. In the compression symbol table 2000, a shorter compression symbol is allocated to a character having a larger frequency of appearance. FIG. 21 is a schematic of the Huffman tree h-2 generated from the compression symbol table 2000 of the archives 200-2.

Figure 23:
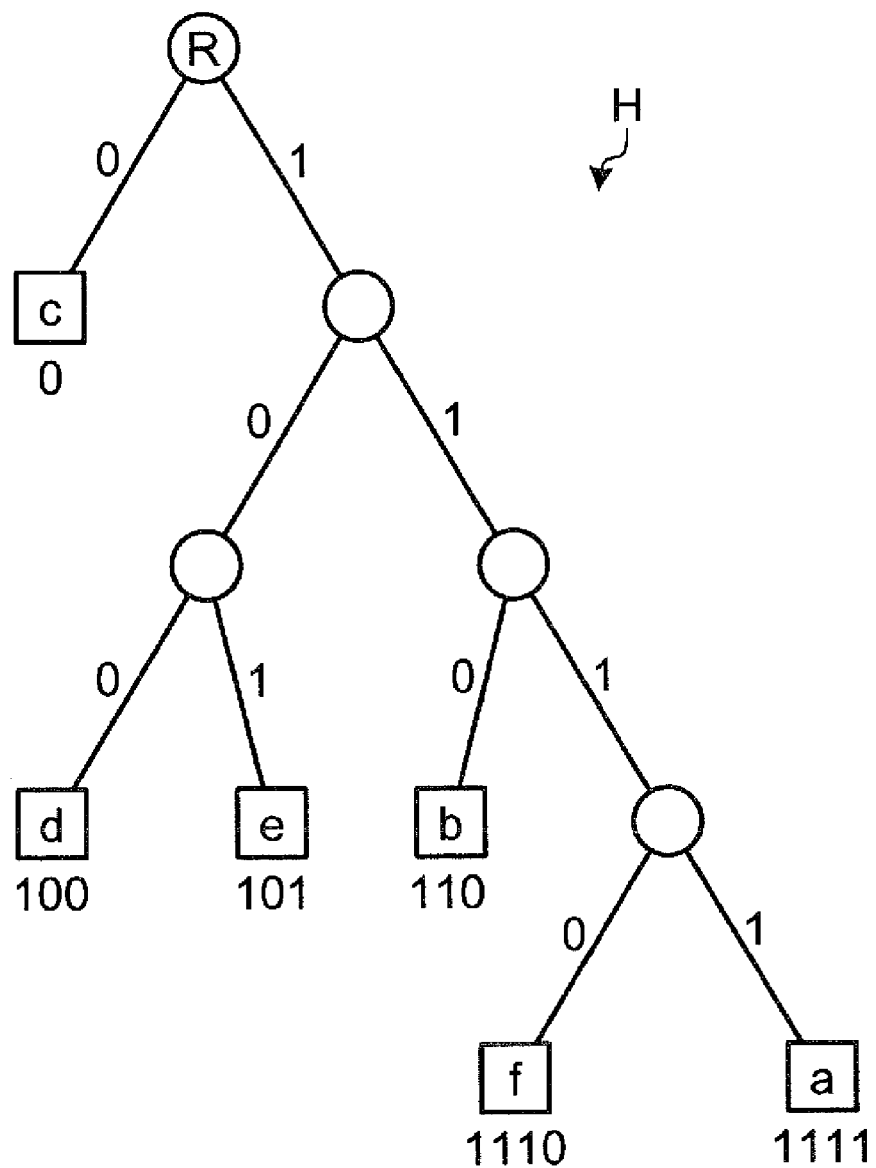
FIG. 23 is a schematic of a common Huffman tree generated from the compression symbol table of the integrated archives.

FIG. 22 is a schematic of a compression symbol table and the compression parameter 221 of the integrated archives 200A. Because the integrated archives A is a integration of the archives 200-1 and 200-2, characters "a" to "f" are described in the files that are to be searched, are compressed, and are included in the integrated archives A. Therefore, the frequency of appearance of the common compression parameter P depicted in FIG. 22 is a value obtained by summing, for each character, the frequency of appearance of the compression parameter P1 of the archives 200-1 and of the compression parameter P2 of the archives 200-2. FIG. 23 is a schematic of the common Huffman tree H generated from the compression symbol table of the integrated archives A.

Reconfiguration of the archives in the second embodiment will be described. The integrated archives A are generated by integrating the archives 200-1 and the archives 200-2. The stored contents of the archives 200-1 will be described.

Figure 24:
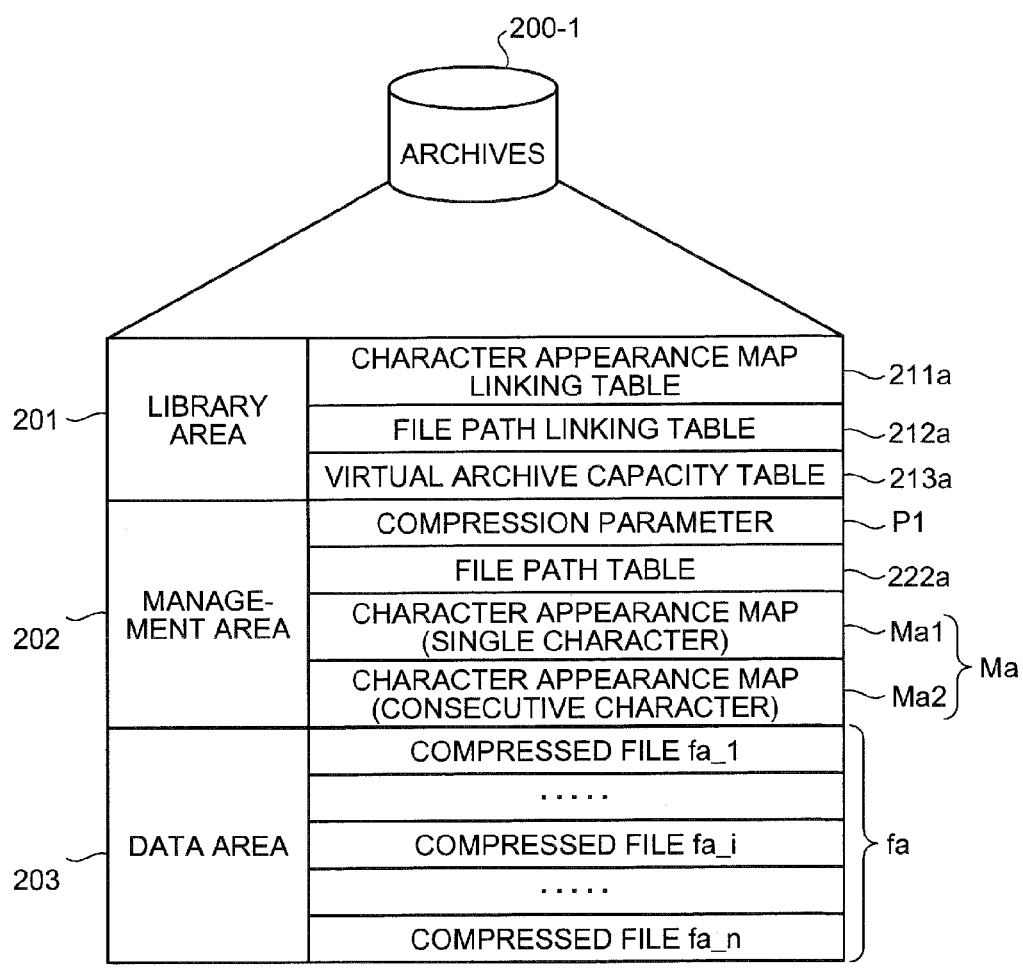
FIG. 24 is a schematic of the stored contents of the archives 200-1.

FIG. 24 is a schematic of the stored contents of the archives 200-1. The archives 200-1 are stored in the storage area 230 such as the RAM 103 or the magnetic disc 105 depicted in FIG. 1. The archives 200-1 include the library area 201, the management area 202, and the data area 203. The library area 201 stores therein a character appearance map linking table 211a, a file path linking table 212a, and a virtual archive capacity table 213a. The management area 202 stores therein the compression parameter P1, a file path table 222a, and a character appearance map Ma (including a single-character appearance map Ma1 and a consecutive-character appearance map Ma2). The data area 203 stores therein a compressed file group fa (compressed files fa_1 to fa_n) as depicted in FIG. 3. Descriptions of these components are identical to those described in the first embodiment.

FIG. 25 is a schematic of the single-character appearance map Ma1 of the archives 200-1. FIG. 26 is a schematic of the consecutive-character appearance map Ma2 of the archives 200-1. In the character appearance map Ma of the archives 200-1, for convenience, to distinguish bit numbers in the archives 200-1 from the bit numbers in the archives 200-2, the bit numbers in the archives 200-1 are indicated as a_1 to a_n. FIG. 27 is a schematic of the compression parameter P1 of the archives 200-1. FIG. 28 is a schematic of a file path table 222a of the archives 200-1. FIG. 29 is a schematic of a character appearance map linking table 211a of the archives 200-1. FIG. 30 is a schematic of a file path linking table 212a of the archives 200-1.

Figures 31, 32:
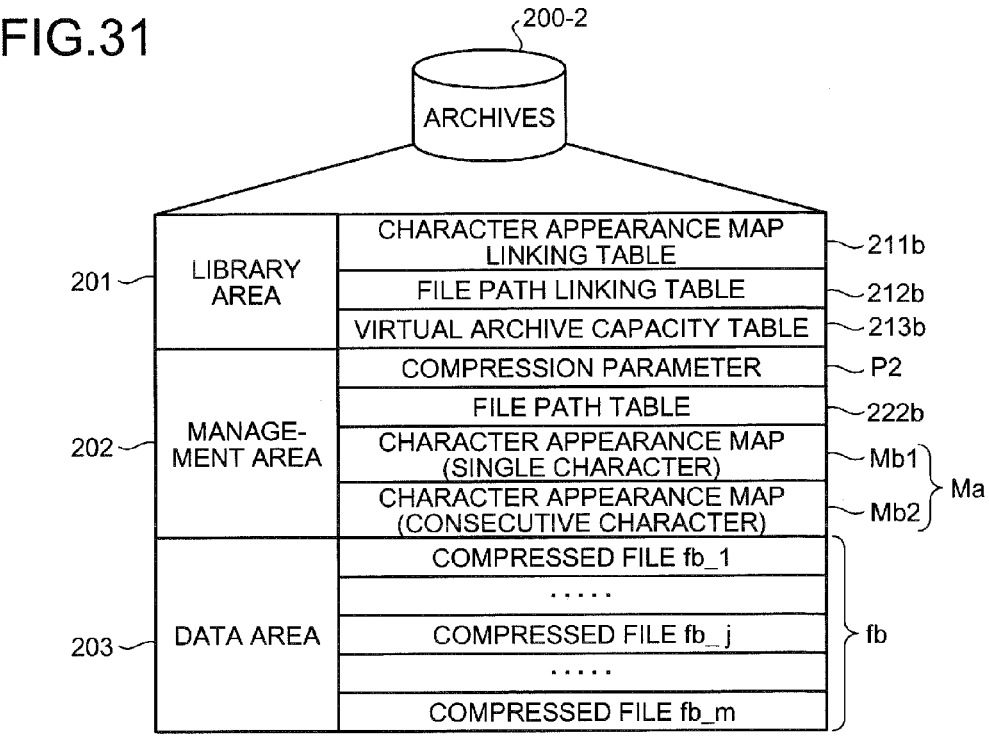
FIG. 31 is a schematic of the stored contents of the archives 200-2.
FIG. 32 is a schematic of the single-character appearance map of the archives 200-2.

FIG. 31 is a schematic of the stored contents of the archives 200-2. The archives 200-2 are stored in the storage area 230 such as the RAM 103 or the magnetic disc 105 depicted in FIG. 1. The archives 200-2 include the library area 201, the management area 202, and the data area 203. The library area 201 stores therein a character appearance map linking table 211b, a file path linking table 212b, and a virtual archive capacity table 213b. The management area 202 stores therein the compression parameter P2, a file path table 222b, and a character appearance map Mb (including a single-character appearance map Mb1 and a consecutive-character appearance map Mb2). The data area 203 stores therein a compressed file group fb (compressed files fb_1 to fb_m) as depicted in FIG. 3. Descriptions of these components are identical to those described in the first embodiment.

FIG. 32 is a schematic of the single-character appearance map Mb1 of the archives 200-2. FIG. 33 is a schematic of the consecutive-character appearance map Mb2 of the archives 200-2. In the character appearance map Mb of the archives 200-2, for convenience, to distinguish the bit numbers in the archives 200-2 from those in the archives 200-1, the bit numbers in the archives 200-2 are indicated as b_1 to b_m. FIG. 34 is a schematic of the compression parameter P2 of the archives 200-2. FIG. 35 is a schematic of a file path table 222b of the archives 200-2. FIG. 36 is a schematic of a character appearance map linking table 211b of the archives 200-2. FIG. 37 is a schematic of a file path linking table 212b of the archives 200-2.

FIG. 38 is a schematic for explaining an example of common parameter generation. The common compression parameter P is generated by summing, for each of the characters, the frequency of appearance of the compression parameter P1 of the archives 200-1 and of the compression parameter P2 of the archives 200-2.

FIG. 39 is a schematic for explaining a reconfiguration of the character appearance map linking tables 211a and 211b. The character appearance map linking table 211a of the archive 200-1 and the character appearance map linking table 211b of the archives 200-2 are integrated and the items in the tables 211a and 211b are sorted in descending order of access frequency. A character appearance map linking table 3900 obtained after the integration includes access frequencies for n+m bit numbers, respectively. Subsequently, the access frequencies are allocated to the slave servers 1502-1 and 1502-2 such that the access frequencies are substantially equivalent between the slave servers 1502-1 and 1502-2.

A new character appearance map linking table 3900a is generated by allocating, to the slave server 1502-1, the access frequencies of the bit numbers whose sort positions in descending order of access frequency are odd numbered. A new character appearance map linking table 3900b is generated by allocating, to the slave server 1502-2, the access frequencies of the bit numbers whose sort positions in descending order of access frequency are even numbered. The sort positions are divided into odd-numbered sort positions and even numbered sort positions as a method of allocation in this example. However, the sort positions one, four, five, eight, nine, etc., may be allocated to the slave server 1502-1 while the sort positions two, three, six, seven, ten, etc., may be allocated to the slave server 1502-2. Further, any allocation method may be employed as far as the sort positions (or the access frequencies) are allocated such that the totals of the allocated sort positions (or the allocated access frequencies) are equivalent.

FIG. 40 is a schematic for explaining reconfiguration of the file path linking tables 212a and 212b. The file path linking tables 212a and 212b respectively of the sets of archives 200-1 and 200-2 are integrated. A file path linking table 4000 obtained after the integration includes file paths for a total of n+m bit numbers. Subsequently, the bit numbers are allocated according to the allocation method employed for the character appearance map linking table 3900.

Thus, for the slave server 1502-1, a file path linking table 4000a for the same bit numbers as the bit numbers in the character appearance map linking table 3900a allocated to the slave server 1502-1 is obtained. Similarly, for the slave server 1502-2, a file path linking table 4000b for the same bit numbers as the bit numbers in the character appearance map linking table 3900b allocated to the slave server 1502-2 is obtained.

FIG. 41 is a schematic for explaining reconfiguration of the file path tables 222a and 222b. The file path tables 222a and 222b respectively of the sets of archives 200-1 and 200-2 are integrated. A file path table 4100 obtained after the integration has file paths for a total of n+m file IDs. The file IDs corresponding to the bit numbers are allocated according to the allocation method employed for the character appearance map linking table 3900.

Thus, for the slave server 1502-1, a file path table 4100a for the file IDs corresponding to the same bit numbers as the bit numbers in the character appearance map linking table 3900a allocated to the slave server 1502-1 is obtained. Similarly, for the slave server 1502-2, a file path table 4100b for the file IDs corresponding to the same bit numbers as the bit numbers in the character appearance map linking table 3900b allocated to the slave server 1502-2 is obtained.

FIG. 42 is a schematic for explaining reconfiguration of the single-character appearance maps Ma1 and Mb1. The single-character appearance maps Ma1 and Mb1 respectively of the sets of archives 200-1 and 200-2 are integrated. A single-character appearance map Mab1 obtained after the integration has a bit row including a total of n+m bits for each character. Subsequently, the bit numbers are allocated according to the allocation method employed for the character appearance map linking table 3900.

Thus, for the slave server 1502-1, a single-character appearance map MA1 for the same bit numbers as the bit numbers in the character appearance map linking table 3900a allocated to the slave server 1502-1 is obtained. Similarly, for the slave server 1502-2, a single-character appearance map MB1 for the same bit numbers as the bit numbers in the character appearance map linking table 3900b allocated to the slave server 1502-2 is obtained.

Figure 43:
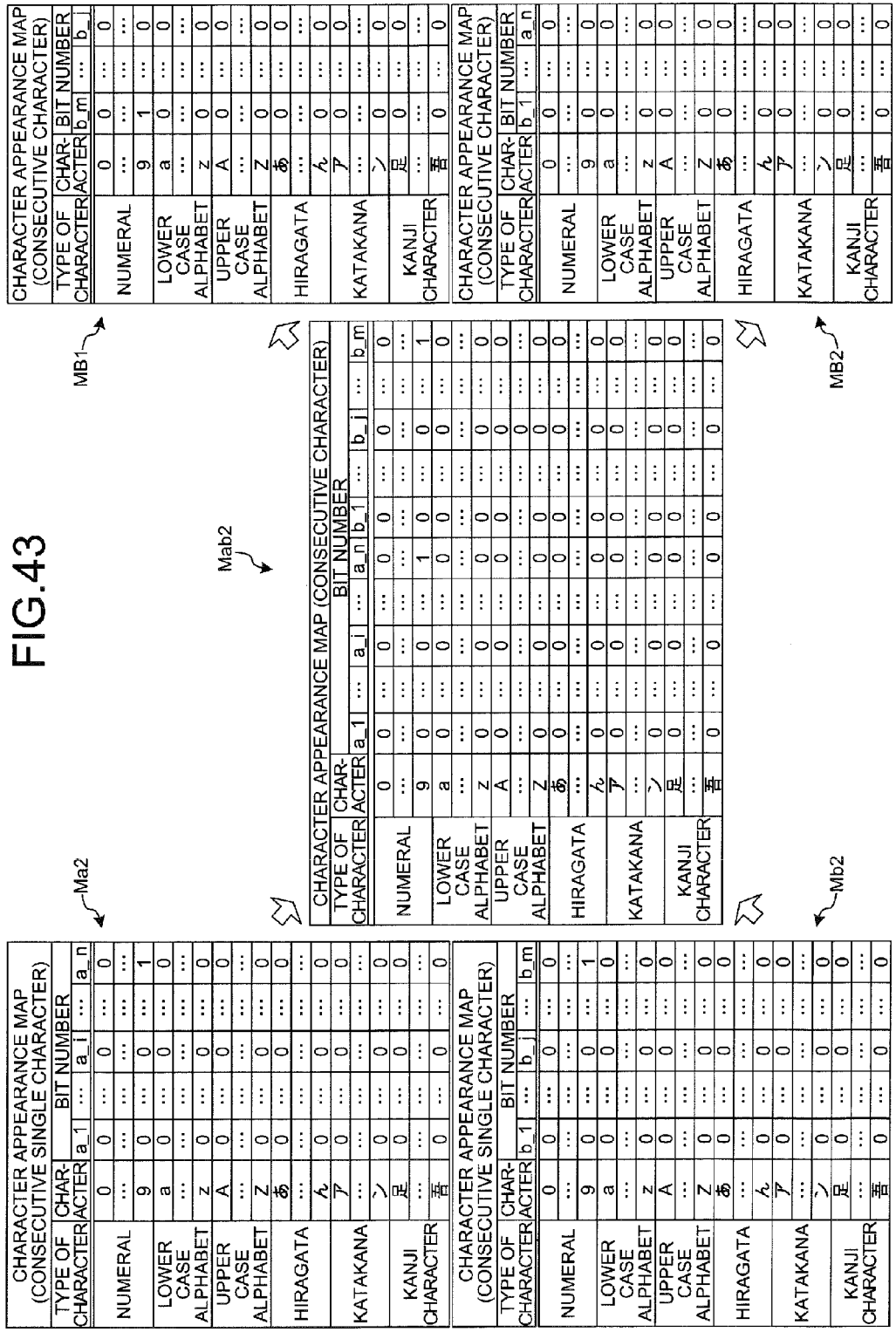
FIG. 43 is a schematic for explaining reconfiguration of the consecutive-character appearance maps.

FIG. 43 is a schematic for explaining reconfiguration of the consecutive-character appearance maps Ma2 and Mb2. The consecutive-character appearance maps Ma2 and Mb2 respectively of the sets of archives 200-1 and 200-2 are integrated. A consecutive-character appearance map Mab2 obtained after the integration has bit a string including n+m bits in total for each character. Subsequently, the bit numbers are allocated according to the allocation method employed for the character appearance map linking table 3900.

Thus, for the slave server 1502-1, a consecutive-character appearance map MA1 for the same bit numbers as the bit numbers in the character appearance map linking table 3900a allocated to the slave server 1502-1 is obtained. Similarly, for the slave server 1502-2, a consecutive-character appearance map MB2 for the same bit numbers as the bit numbers in the character appearance map linking table 3900b allocated to the slave server 1502-2 is obtained.

Figure 44:
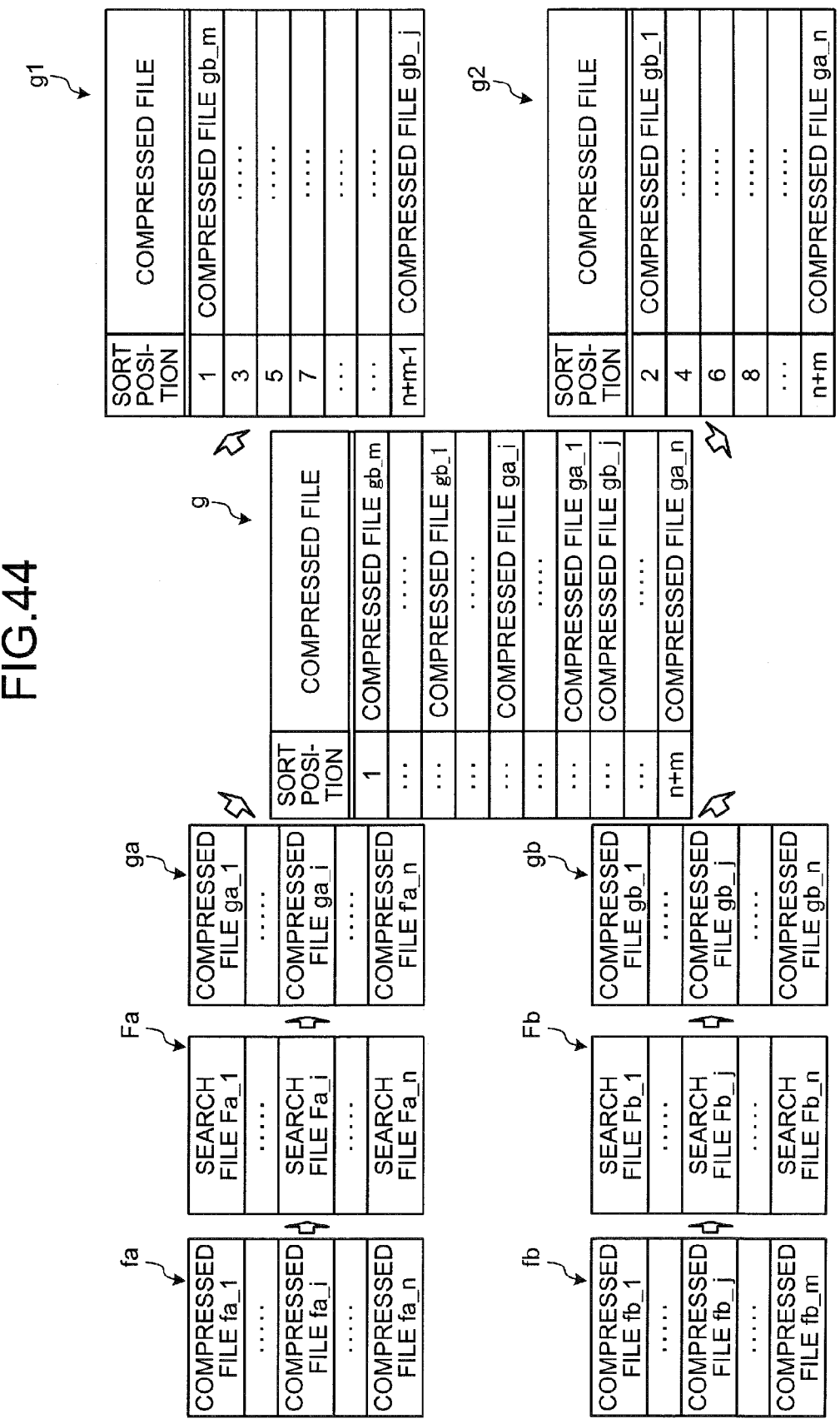
FIG. 44 is a schematic for explaining reconfiguration of the compressed file groups.

FIG. 44 is a schematic for explaining reconfiguration of the compressed file groups fa and fb. The compressed file group fa of the archives 200-1 is expanded using the Huffman tree h-1 corresponding thereto. Thus, a file group Fa to be searched is obtained. Similarly, the compressed file group fb of the archives 200-2 is expanded using the Huffman tree h-2 corresponding thereto. Thus, a file group Fb to be searched is obtained.

The file group Fa to be searched is recompressed using the common Huffman tree H. Thus, a compressed file group ga is obtained. Similarly, the file group Fb to be searched is recompressed using the common Huffman tree H. Thus, a compressed file group gb is obtained.

Subsequently, the compressed file groups ga and gb that have been recompressed are integrated. The files are sorted in descending order of access frequency according to the allocation method employed for the character appearance map linking table 3900. Thus, an integrated compressed file group "g" in descending order of access frequency is obtained.

Hence, a compressed file group g1 for the same bit numbers as the bit numbers in the character appearance map linking table 3900a allocated to the slave server 1502-1 is allocated to the slave server 1502-1. Similarly, a compressed file group g2 for the same bit numbers as the bit numbers in the character appearance map linking table 3900b allocated to the slave server 1502-2 is allocated to the slave server 1502-2.

Figure 45:
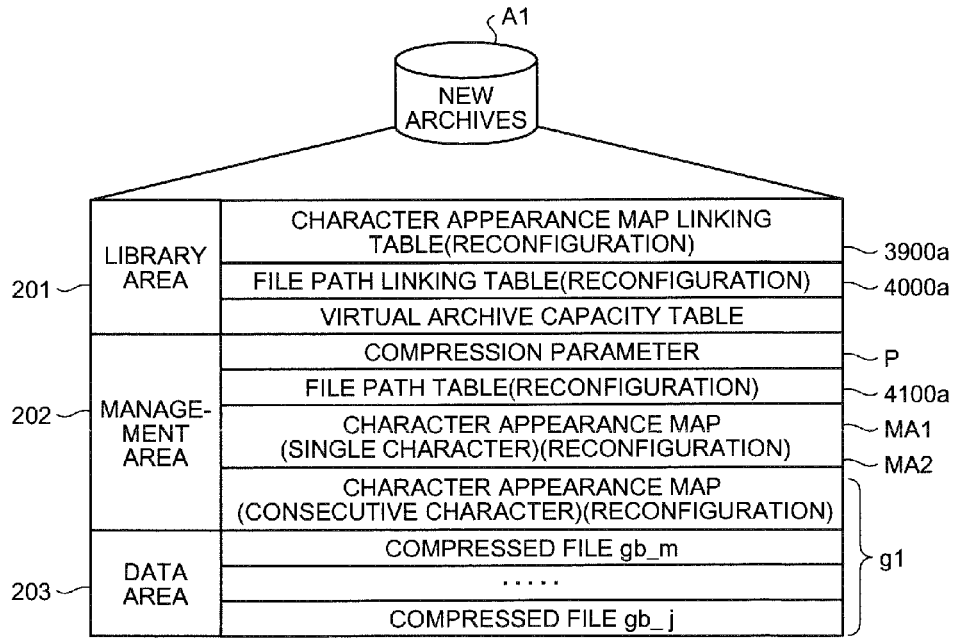
FIG. 45 is a schematic of the stored contents of new archives A1.

FIG. 45 is a schematic of the stored contents of the new archives A1. The new archives A1 are transmitted to the slave server 1502-1. The new archives A1 store therein the common compression parameter P depicted in FIG. 38, the character appearance map linking table 3900a after the reconfiguration depicted in FIG. 39, the file path linking table 4000a after the reconfiguration depicted in FIG. 40, the file path table 4100a after the reconfiguration depicted in FIG. 41, the single-character appearance map MA1 after the reconfiguration depicted in FIG. 42, the consecutive-character appearance map M2 after the reconfiguration depicted in FIG. 43, and the compressed file group g1 after the reconfiguration depicted in FIG. 44.

Figure 46:
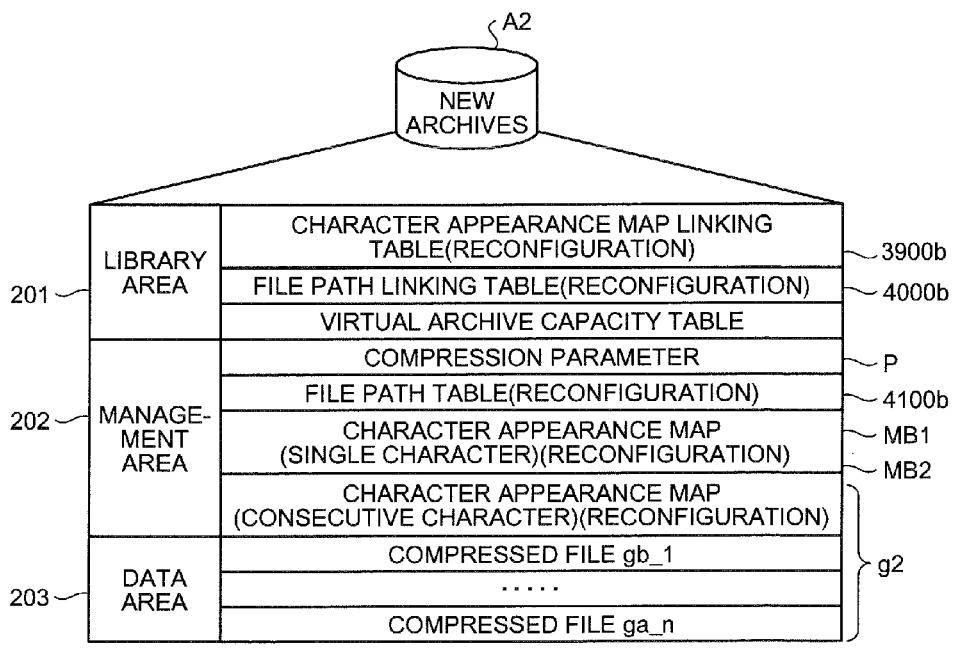
FIG. 46 is a schematic of the stored contents of new archives A2.

FIG. 46 is a schematic of the stored contents of the new archives A2. The new archives A2 are transmitted to the slave server 1502-2. The new archives A2 stores therein the common compression parameter P depicted in FIG. 38, the character appearance map linking table 3900b after the reconfiguration depicted in FIG. 39, the file path linking table 4000b after the reconfiguration depicted in FIG. 40, the file path table 4100b after the reconfiguration depicted in FIG. 41, the single-character appearance map MB1 after the reconfiguration depicted in FIG. 42, the consecutive-character appearance map MB2 after the reconfiguration depicted in FIG. 43, and the compressed file group g2 after the reconfiguration depicted in FIG. 44.

Figure 47:
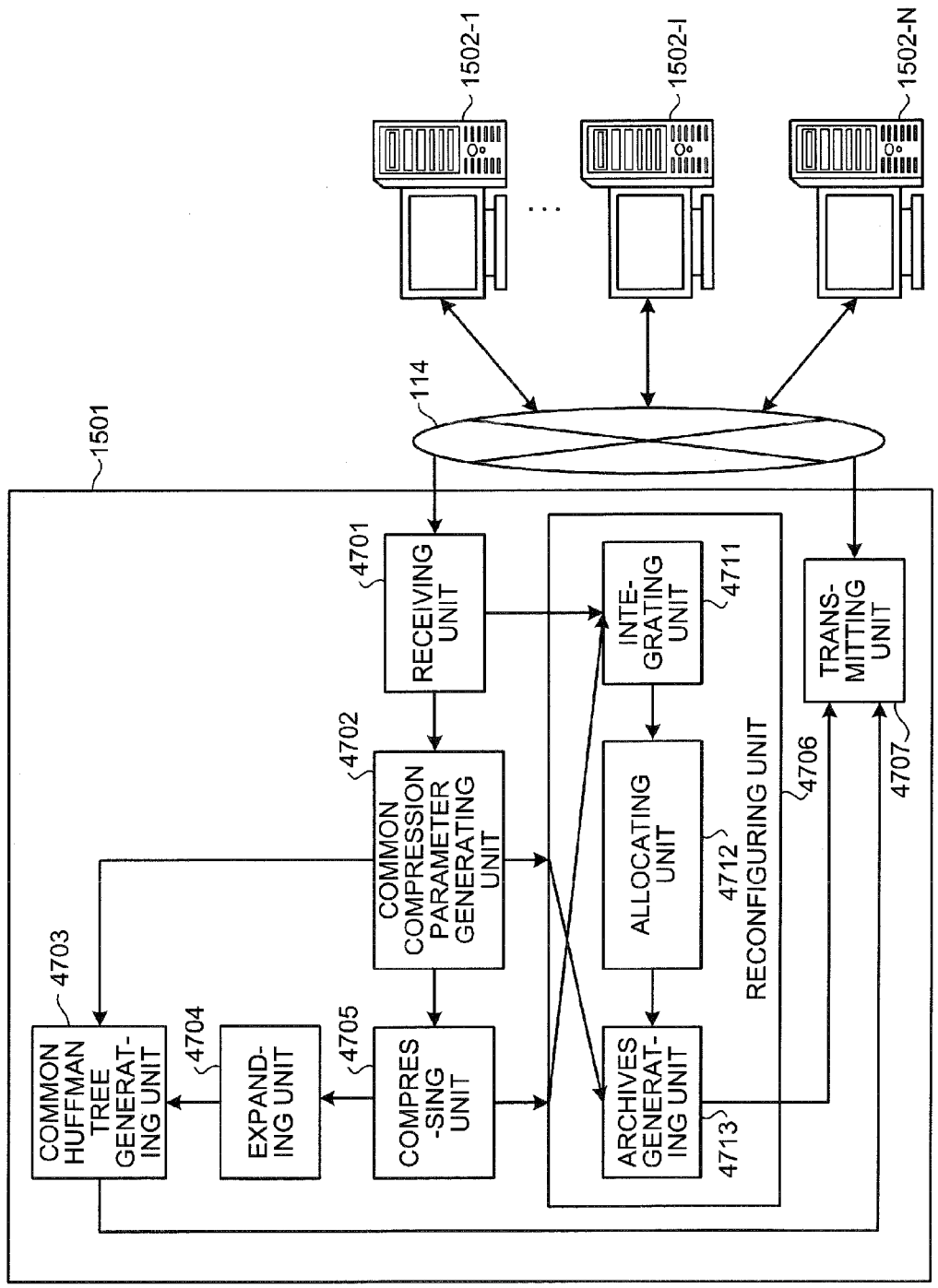
FIG. 47 is a block diagram of a functional configuration of the master server (information managing apparatus)

FIG. 47 is a block diagram of a functional configuration of the master server 1501 (information managing apparatus). The master server 1501 includes a receiving unit 4701, a common compressed parameter generating unit 4702, a common Huffman tree generating unit 4703, an expanding unit 4704, a compressing unit 4705, a reconfiguring unit 4706, and a transmitting unit 4707. Functions of the units from the receiving unit 4701 to the transmitting unit 4707 are implemented by, for example, causing the CPU 101 to execute a program stored in the storage area such as the ROM 102, the RAM 103, and the magnetic disc 105 depicted in FIG. 1, or by the I/F 109.

The receiving unit 4701 has a function of receiving data transmitted from the slave server 1502-1. More specifically, for example, the receiving unit 4701 receives the sets of archives 200-1 to 200-N and the Huffman trees h-1 to h-N from the slave servers 1502-1 to 1502-N.

The common compression parameter generating unit 4702 has a function of generating the common compression parameter P for all sets of archives 200-1 to 200-N. More specifically, for example, as depicted in FIG. 38, the compression parameters P1 and P2 included in the sets of archives 200-1 and 200-2 received from the slave servers 1502-1 and 1502-2 are extracted. The common compression parameter P is generated by summing, for each character, the frequency of appearance of the extracted compression parameters P1 and P2. The generated common compression parameter P is transmitted to the common Huffman tree generating unit 4703 and the archives generating unit 4713.

The common Huffman tree generating unit 4703 has a function of generating the common Huffman tree H for all sets of archives 200-1 to 200-N. More specifically, for example, the common Huffman tree generating unit 4703 generates the common Huffman tree H by allocating "0" and "1" to characters in descending order of the frequency of appearance of the common compression parameter P using the binary search (see FIGS. 22 and 23). The generated common Huffman tree is transmitted to the expanding unit 4704 and the archives generating unit 4713.

The expanding unit 4704 has a function of expanding the compressed file group f included in the archives 200-1 for each set of archives 200-I. The Huffman tree used in the expansion process is the Huffman tree h-1 transmitted together with the archives 200-I. For example, as depicted in FIG. 44, the file group Fa to be searched is formed by expanding the compressed file group fa using the Huffman tree h-1 that is used for the compression of the compressed file group fa. Similarly, the file group Fb to be searched is obtained by expanding the compressed file group fb using the Huffman tree h-2 that is used for the compression of the compressed file group fb.

The compressing unit 4705 has a function of recompressing the file group to be searched that has been expanded by the expanding unit 4704. The Huffman tree used for the recompression is the common Huffman tree H. For example, as depicted in FIG. 44, the compressed file group ga is obtained by recompressing the file group Fa using the common Huffman tree H. Similarly, the compressed file group gb is obtained by recompressing the file group Fb using the Huffman tree H that is used for compressing the file group Fb. The compressed file groups ga and gb are integrated by an integrating unit 4711.

The reconfiguring unit 4706 has a function of reconfiguring the each set of received archives 200-I and each Huffman tree h-I. The reconfiguring unit 4706 includes the integrating unit 4711, an allocating unit 4712, and an archives generating unit 4713. The integrating unit 4711 has a function of integrating the data in each set of archives 200-I.

More specifically, for example, as depicted in FIGS. 39 to 43, the integrating unit 4711 integrates: the character appearance map linking tables 211a and 211b respectively of the sets of archives 200-1 and 200-2; the file path tables 222a and 222b; the single-character appearance maps Ma1 and Mb1; and the consecutive-character appearance map Ma2 and Mb2 and, thereby, the integrating unit 4711 obtains the character appearance map linking table 3900 after the integration, the file path linking table 4000 after the integration, the file path table 4100 after the integration, the single-character appearance map Mab1 after the integration, and the consecutive-character appearance map Mab2 after the integration.

As depicted in FIG. 44, the integrating unit 4711 integrates the compressed file group ga and gb that are recompressed by the compressing unit 4705 respectively for the sets of archives 200-1 and 200-2 and the integrating unit 4711 obtains the compressed file group g after the integration.

The allocating unit 4712 has a function of allocating to each slave server 1502-I, the data integrated by the integrating unit 4711 such that the access frequency after the allocation is equivalent in each slave server 1502-I for each set of archives.

More specifically, for example, as depicted in FIG. 39, the records of the character appearance map linking table 3900 after the integration are allocated such that the access frequencies or the sort positions thereof are substantially equivalent, and thereby, the character appearance map linking tables 3900a and 3900b reconfigured respectively for the slave servers 1502-1 and 1502-2 are obtained.

Descriptions of the file path linking table 4000 after the integration, the file path table 4100 after the integration, the single-character appearance map Mab1 after the integration, and the consecutive-character appearance map Mab2 are identical to those given with respect to FIGS. 40 to 43. As depicted in FIG. 44, the allocating unit 4712 further allocates, for the compressed file group g after the integration, such that the access frequencies or the sort positions thereof are substantially equivalent, and the compressed file groups g1 and g2 that are reconfigured for each of the slave servers 1502-1 and 1502-2 are obtained.

The archives generating unit 4713 has a function of generating new archives that are reconfigured for each slave server 1502-I. More specifically, for example, the archives generating unit 4713 aggregates, for each of the slave servers 1502-1 and 1502-2, the data allocated respectively thereto and thereby, forms the sets of new archives A1 and A2.

The transmitting unit 4707 has a function of transmitting data to slave servers 1502-I. More specifically, for example, the transmitting unit 4707 transmits a request for the collection of the sets of archives 200-1 to 200-N and the Huffman trees h-1 to h-N. The transmitting unit 4707 transmits the new archives A1 (A2) respectively together with the common Huffman tree H to respective allocation destinations, the slave server 1502-1 (1502-2).

Figure 48:
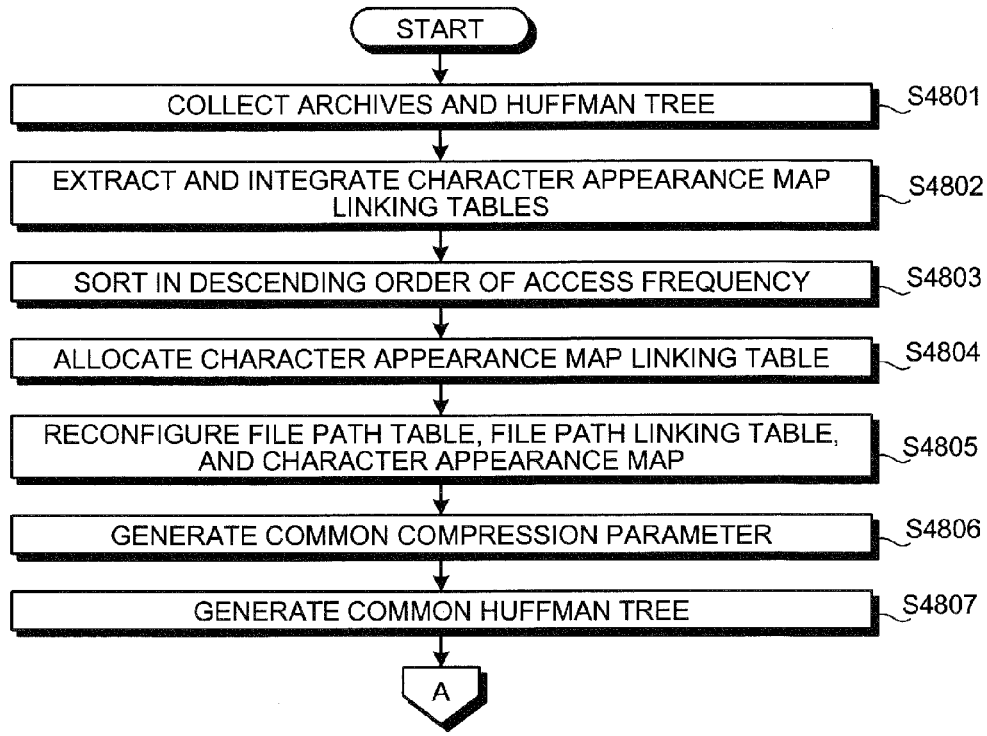
FIGS. 48 and 49 are flowcharts of an archives reconfiguring process by the master server.
Figure 49:
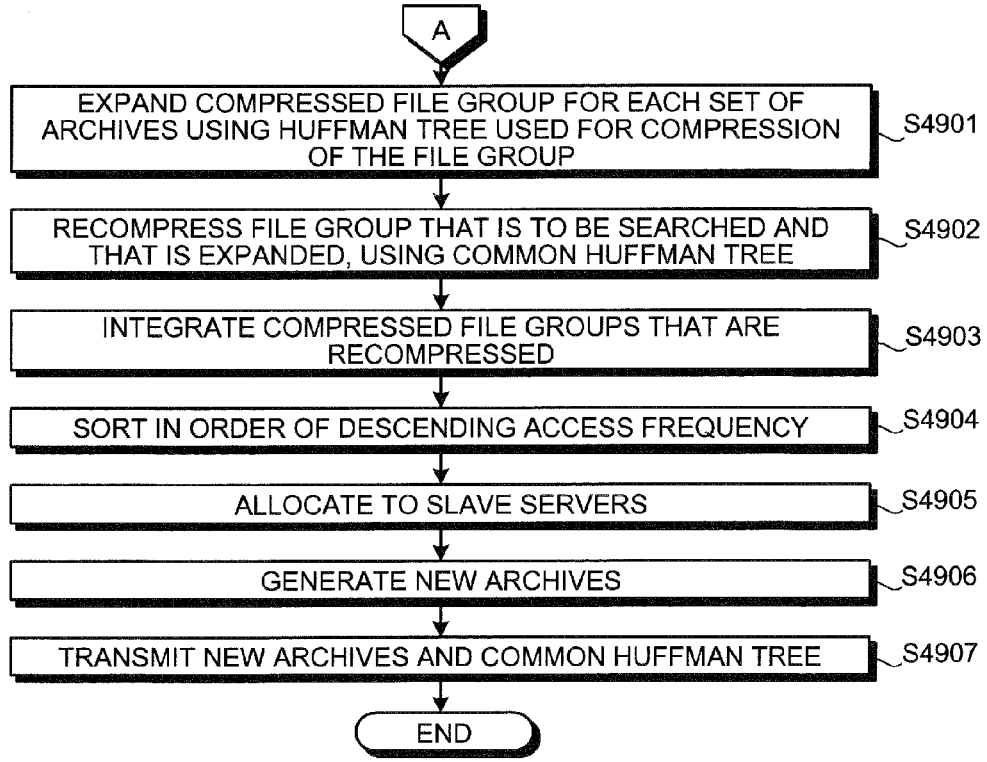

FIGS. 48 and 49 are flowcharts of the archives reconfiguring process by the master server 1501. As depicted in FIG. 48, the receiving unit 4701 collects the sets of archives 200-1 to 200-N and the Huffman trees h-1 to h-N of the slave servers 1502-1 to 1502-N (step S4801).

The integrating unit 4711 extracts and integrates the character appearance map linking tables 211a and 211b in the sets of archives 200-1 and 200-2 (step S4802). The allocating unit sorts the character appearance map linking table 3900 after the integration in descending order of access frequency (step S4803), and allocates the character appearance map linking tables 3900a and 3900b respectively to the slave servers 1502-1 and 1502-2 (step S4804).

The file path tables 222a and 222b, the file path linking tables 212a and 212b, and the character appearance maps Ma and Mb are integrated, and are allocated to slave servers 1502-1 and 1502-2 according to bit numbers that each have a high access frequency (or the corresponding file ID) and, thereby, the reconfiguration is executed (step S4805).

The common compression parameter generating unit 4702 generates the common compression parameter P (step S4806). The common Huffman tree generating unit 4703 generates the common Huffman tree H (step S4807).

As depicted in FIG. 49, the expanding unit 4704 expands the compressed file groups fa and fb respectively for the sets of archives 200-1 and 200-2 using respectively the Huffman trees h-1 and h-2 that are used for the compression of the file groups fa and fb (step S4901). The compressing unit 4705 recompresses the file groups Fa and Fb that are to be searched and that have been expanded respectively for the sets of archives 200-1 and 200-2, using the common Huffman tree H (step S4902). The integrating unit 4711 integrates the compressed file groups ga and gb that have been recompressed (step S4903), and sorts the bit numbers in descending order of access frequency (step S4904).

Subsequently, the allocating unit 4712 allocates the bit numbers to the slave servers 1502-1 and 1502-2 such that the totals of the access frequencies or the sort positions thereof are substantially equivalent (step S4905). The archives generating unit 4713 generates the sets of new archives A1 and A2 respectively for the slave servers 1502-1 and 1502-2 (step S4906), and transmits the new archives A1 (A2) and the common Huffman tree H to the slave server 1502-1 (1502-2) that is the allocation destination of the new archives A1 (A2) (step S4907), ending a series of processing.

As described above, according to the second embodiment, by reconfiguring the sets of archives 200-1 and 200-2 of the slave servers 1502-1 and 1502-2, substantial equalization of the searching speed between the slave servers 1502-1 and 1502-2 is achieved. Therefore, when the same search character string is given to each of the slave servers 1502-1 and 1502-2, the search results are returned substantially simultaneously from the slave servers 1502-1 and 1502-2. That is, the waiting time for the last search result can be reduced and therefore, improvement of the searching speed is enabled.

A third embodiment is configured by improving a portion of the second embodiment. The second embodiment is configured to execute the step of expanding the compressed file group of each set of archives 200-I using the Huffman tree h-1 that is used for compressing the compressed file group, and the step of recompressing the file group that has been expanded and is to be searched, using the common Huffman tree H are executed. The second embodiment is also configured to be able to compress and expand in each slave server 1502-I using the common Huffman tree H by executing this two-path processing, that is, the expansion and the recompression.

Whereas, the third embodiment is configured to identify, from the common Huffman tree H, the leaves of the same characters as the expanded characters buried in the leaves of the Huffman tree of each slave server 1502-I by the expansion process using the Huffman tree. In addition, the compressed symbols allocated to the identified leaves of the common Huffman tree H are set instead of the expanded characters of the leaves of the Huffman tree h-I that is the identification origin. The Huffman tree after the setting is referred to as "converting Huffman tree".

The compressed file group is converted into a compressed file group corresponding to the compression symbol of the common Huffman tree H by executing the expansion process of the compressed file group that has been compressed using the Huffman tree h-1 obtained before setting, using the converting Huffman tree. In this manner, the compressed file group corresponding to the compression symbol of the common Huffman tree H, remaining in the compressed format, can be obtained for each slave server 1502-I by the one-path processing of one converting process. Therefore, an increased speed of the reconfiguring process in the master server 1501 can be realized.

The components identical to those in the first and the second embodiments are given identical reference numerals and the description thereof is omitted. In the third embodiment, for the simplicity of description, the description will be given assuming that the number of the master servers 1502-I is two (N=2).

Figure 50:
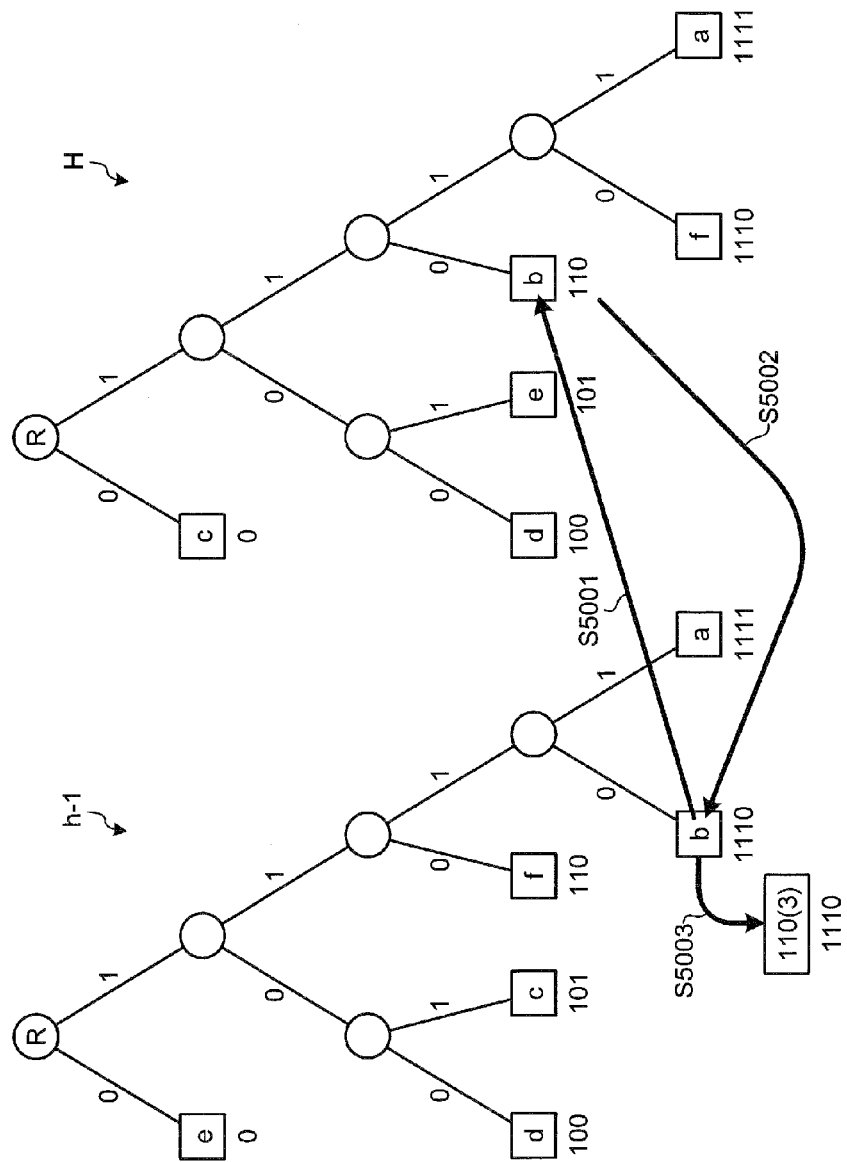
FIG. 50 is a schematic for explaining an example of generating a converting Huffman tree.

FIG. 50 is a schematic for explaining an example of generating the converting Huffman tree. The example depicted in FIG. 50 is of generation that uses the Huffman tree h-I of the archives 200-I and the common Huffman tree H. In the example, the leaf to which a character "b" of a Huffman tree b-1 is set is noted. A leaf of the common Huffman tree to which the same character as the character "b" of the noted leaf is identified (step S5001). A compression symbol "110" and the length of the compression symbol (in this example, "three") that are allocated to the character "b" of the identified leaf of the common Huffman tree are read (step S5002). Instead of the character "b" set to the noted leaf, the compression symbol and the length of the compression symbol "110 (3)" that are read are written (step S5003). Other characters "a", "c", to "f" are similarly converted.

Figure 51:
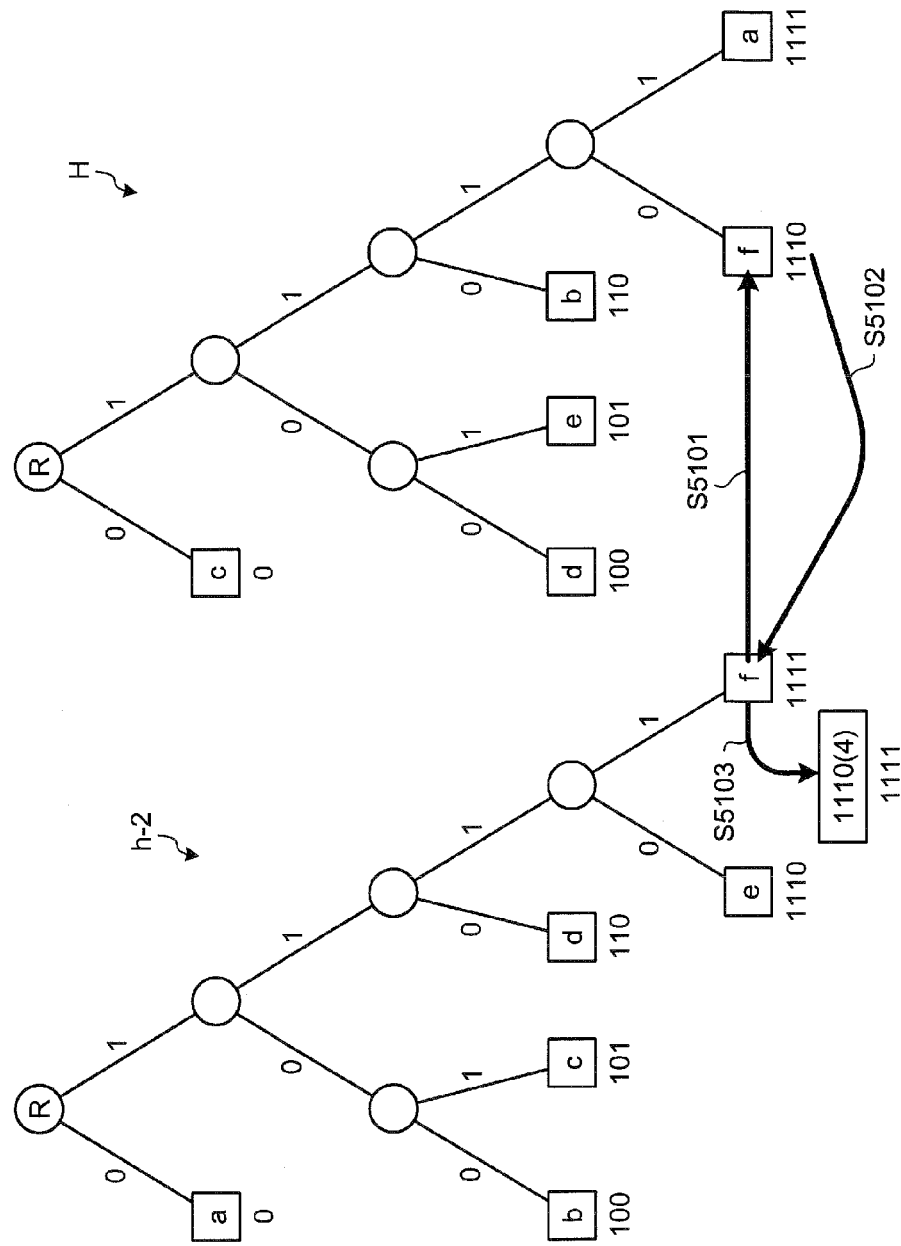
FIG. 51 is a schematic for explaining a second example of generating a converting Huffman tree.

FIG. 51 is a schematic for explaining a second example of generating the converting Huffman tree. The example depicted in FIG. 51 is of generation that uses the Huffman tree h-2 of the archives 200-2 and the common Huffman tree H. In the example, a leaf to which a character "f" of the Huffman tree h-2 is noted. A leaf of the common Huffman tree to which the same character as the character "f" of the noted leaf is identified (step S5101). A compression symbol "1110" and the length of the compression symbol (in this example, "four") that are allocated to the character "f" of the identified leaf of the common Huffman tree are read (step S5102). Instead of the character "f" set to the noted leaf, the compression symbol and the length of the compression symbol "1110 (4)" that are read are written (step S5103). Other characters "a" to "e" are similarly converted.

Figure 52:
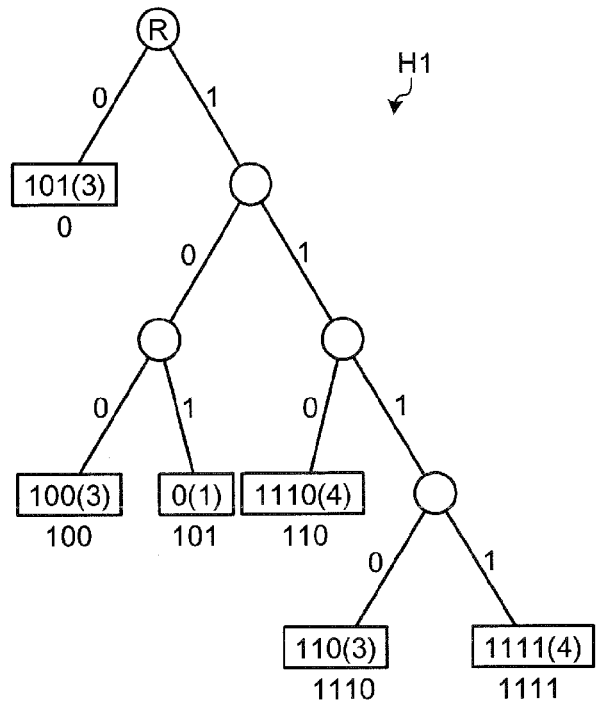
FIG. 52 is a schematic of a first converting Huffman tree.

FIG. 52 is a schematic of a first converting Huffman tree. A converting Huffman tree H1 is a Huffman tree generated by the generation process that uses the Huffman tree h-1 of the archives 200-1 and the common Huffman tree H depicted in FIG. 50. For example, when expansion aiming at an expanded character to which the compression symbol "1110" is allocated is attempted using the converting Huffman tree H1, the expansion does not provide the character "b" depicted in FIG. 50, but rather provides conversion to the compression symbol "110" set instead of the character "b". Therefore, the two-path processing including the expansion and the recompression of the compressed file is not necessary. Hence, the compressed file that can be compressed and expanded using the common Huffman tree H can be obtained by the one-path processing handling the compressed file in the compressed format.

Figure 53:
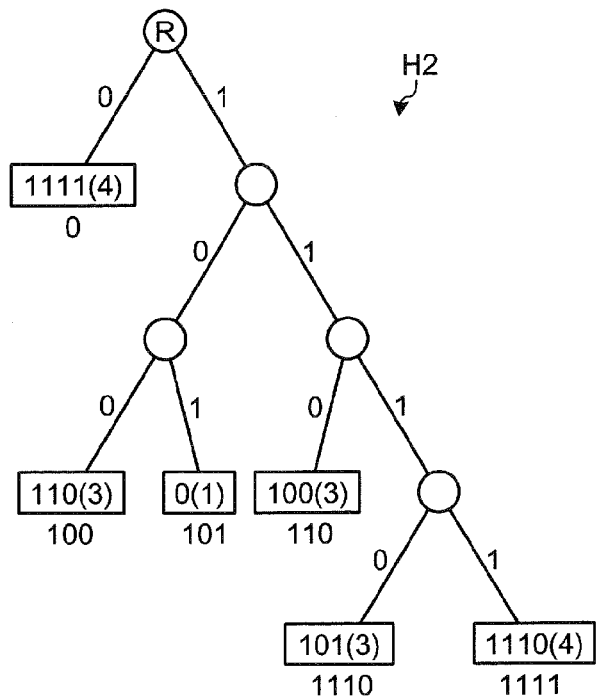
FIG. 53 is a schematic of a second converting Huffman tree.

FIG. 53 is a schematic of a second converting Huffman tree. A converting Huffman tree H2 is a Huffman tree generated by the generation process that uses the Huffman tree h-2 of the archives 200-2 and the common Huffman tree H depicted in FIG. 51. For example, when expansion aiming at an expanded character to which the compression symbol "1111" is allocated is attempted using the converting Huffman tree H2, the expansion does not provide the character "f" depicted in FIG. 51, but rather provides conversion to the compression symbol "1110" set instead of the character "f". Therefore, the two-path processing including the expansion and the recompression of the compressed file is not necessary. Hence, the compressed file that can be compressed and expanded using the common Huffman tree H can be obtained by the one-path processing handling the compressed file in the compressed format.

Figure 54:
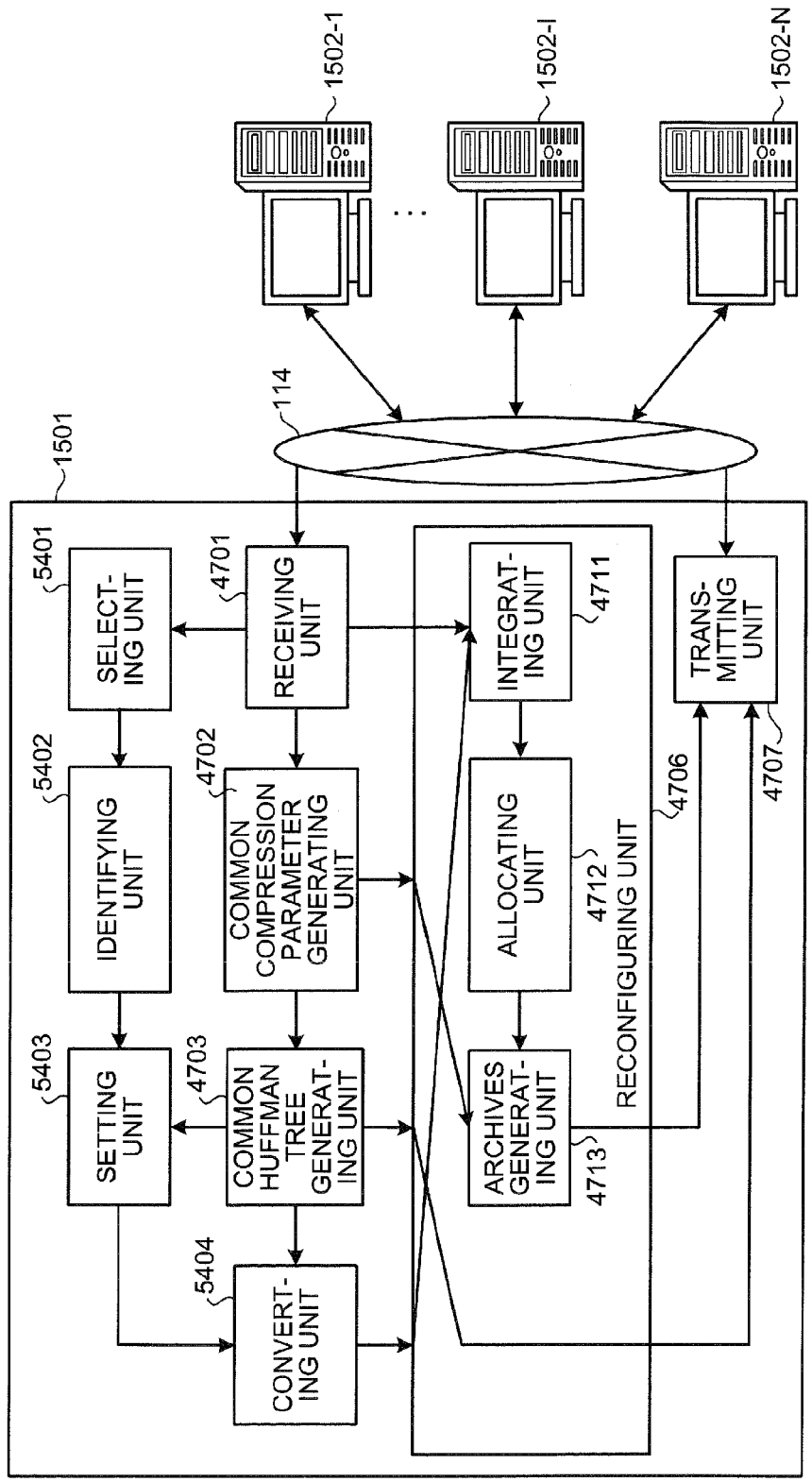
FIG. 54 is a block diagram of a functional configuration of the master server (information managing apparatus) according to a third embodiment.

FIG. 54 is a block diagram of a functional configuration of the master server 1501 (information managing apparatus) according to the third embodiment. In addition to the configuration described in the second embodiment, the master server 1501 includes a selecting unit 5401, an identifying unit 5402, a setting unit 5403, and a converting unit 5404. More specifically, functions of the units from the selecting unit 5401 to the converting unit 5404 are implemented by, for example, causing the CPU 101 to execute a program stored in the storage area such as the ROM 102, the RAM 103, and the magnetic disc 105 depicted in FIG. 1, or by the I/F 109.

The selecting unit 5401 has a function of successively selecting arbitrary leaves from the Huffman tree h-I used for compression of the compressed file group in a corresponding archives 200-I, for each set of archives 200-I. More specifically, for example, the selecting unit 5401 successively selects the leaves of the Huffman tree h-I depicted in FIGS. 50 and 51.

The identifying unit 5402 has a function of identifying from the common Huffman tree H, the leaves of the same character as the character expanded, using the leaves successively selected by the selecting unit 5401. More specifically, as depicted in FIGS. 50 and 51, the identifying unit 5402 identifies the leaves of the common Huffman tree H to which the same character is set as depicted in FIGS. 50 and 51.

The setting unit 5403 has a function of setting, to a leaf selected in the Huffman tree h-I, the compressed symbol allocated to the leaf identified by the identifying unit 5402 instead of the character expanded using the selected leaf. More specifically, the setting unit 5403 overwrites the compression symbol identified from the common Huffman tree H into the area into which an expanded character is written in the construction of the selected leaf. The setting unit 5403 writes the length of the compressed symbol into another blank area. In the structure of the leaf that is the setting target, the pointer to an upper node remains as it is and, therefore, the conversion provides the compression symbol written in the structure of the leaf by designating the compression symbol allocated to the selected leaf.

The converting unit 5404 has a function of converting the compressed file compressed using the Huffman trees h-1 and h-2 before the conversion, using the converting Huffman trees H1 and H2 handling the compressed file remaining in the compressed format. Thereby, the compressed file groups ga and gb that can be compressed and expanded using the common Huffman tree H are obtained. Similarly to the second embodiment, the compressed file groups ga and gb after the conversion are integrated by the integrating unit 4711, and are allocated to the slave servers 1502-1 and 1502-2 such that the totals of the access frequencies or the sort positions thereof are substantially equivalent between the slave servers 1502-1 and 1502-2.

Figure 55:
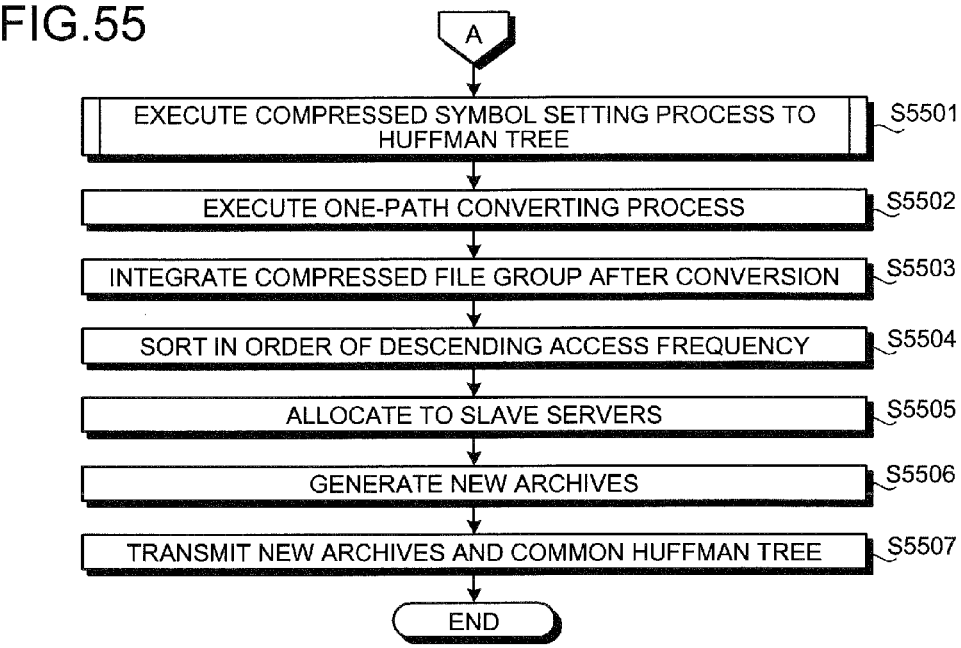
FIG. 55 is a flowchart of the archives reconfiguring process (latter half) by the master server.

FIG. 55 is a flowchart of the archives reconfiguring process (latter half) by the master server 1501. The reconfiguring process (former half) is identical to that depicted in FIG. 18 and the description thereof is omitted.

A compression symbol setting process for the Huffman trees h-1 and h-2 is executed (step S5501). The converting unit 5404 executes the one-path converting process (step S5502). The one-path converting process is executed for each of the compressed file groups ga and gb in the sets of archives 200-1 and 200-2 using the converting Huffman trees Hi and H2 obtained respectively for the sets of archives 200-1 and 200-2.

The integrating unit 4711 integrates the compressed file groups ga and gb after the conversion (step S5503) and sorts in descending order of access frequency (step S5504). Subsequently, the allocating unit 4712 allocates the compressed files to the slave servers 1502-1 and 1502-2 such that the totals of the access frequencies or the sort positions thereof are substantially equivalent (step S5505)

The archives generating unit 4713 generates the sets of new archives A1 and A2 respectively for the slave servers 1502-1 and 1502-2 (step S5506), and transmits the new archives A1 (A2) and the common Huffman tree H to the slave server 1502-1 (1502-2) that is the allocation destination of the new archives A1 (A2) (step S5507) ending a series of processing.

Figure 56:
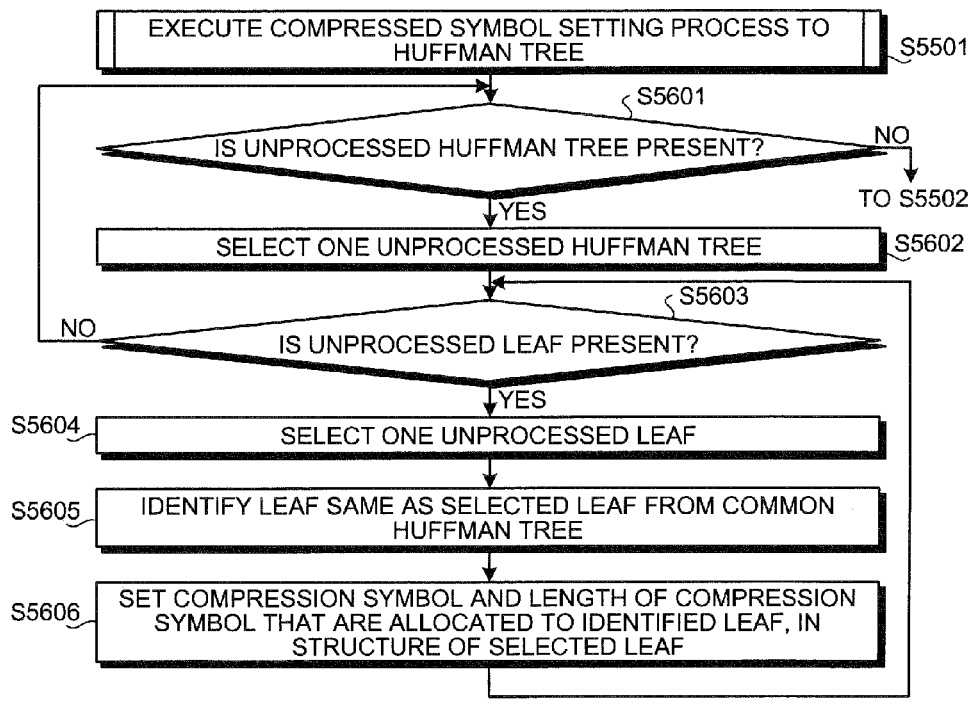
FIG. 56 is a flowchart of a compressed symbol setting process to the Huffman tree.

FIG. 56 is a flowchart of the compressed symbol setting process to the Huffman tree. The selecting unit 5401 judges whether any unprocessed Huffman trees are present from the Huffman trees h-1 and h-2 respectively of the sets of archives 200-1 and 200-2 (step S5601). When an unprocessed Huffman tree is present (step S5601: YES), an unprocessed Huffman tree is selected (step S5602). The selecting unit 5401 judges whether any unprocessed leaves are present in the selected Huffman tree (step S5603).

When an unprocessed leaf is present (step S5603: YES), an unprocessed leaf is selected (step S5604). The identifying unit 5402 identifies the leaf to which the same character as the character set in the selected leaf is set, from the common Huffman tree H (step S5605). Subsequently, the setting unit 5403 sets, in the structure of the selected leaf, the compressed symbol and the length of the compressed symbol that are allocated to the identified leaf (step S5606). The procedure returns to step S5603.

At step S5603, when no unprocessed leaf is present (step S5603: NO), the procedure returns to step S5601. At step S5601, when no unprocessed Huffman tree is present (step S5601: NO), the procedure moves to the one-path converting process (step S5502).

As described above, according to the third embodiment, by utilizing an existing process (the Huffman tree expansion process) the compressed file groups corresponding to the compression symbols of the common Huffman tree, remaining in a compressed format, can be obtained for the slave servers 1502-1 and 1502-2 using a one-path process, i.e., the one-time converting process. Therefore, the file opening process (expansion process) to apply the file to the common Huffman tree H becomes unnecessary and, therefore, increased speed of the archives reconfiguring process in the master server 1501 can be realized. The archives 200 reconfiguring process can be realized with a simple configuration and without creating a new algorithm because the existing process, the Huffman tree expansion process, is applied.

According to the first to the third embodiments, higher efficiency of the search process can be realized by achieving increased speed of the file accessing process when a full text search is implemented to compressed files, handling the files remaining in the compressed format. Increased speed of a full text search can be realized by causing the cache area to be a resident memory and increasing the efficiency of the server resources.

The method explained in the present embodiment can be implemented by a computer, such as a personal computer and a workstation, executing a program that is prepared in advance. The program is recorded on a computer-readable recording medium such as a hard disk, a flexible disk, a CD-ROM, an MO, and a DVD, and is executed by being read out from the recording medium by a computer. The program can be a transmission medium that can be distributed through a network such as the Internet.

According to the first embodiment, compressed files in the archives is compressed using a common parameter; and the management area of the archives has written therein a table that stores therein bit numbers in a character appearance map that uses the head address of each compressed file for the strict selection of the files to be searched such the strict selection described in International Publication Pamphlet No. 2006-123448, and the head addresses of the compressed files corresponding to the bit numbers.

According to the first embodiment, numerous opening processes are possible by executing once the computing of the compression parameters. The head address of a corresponding compressed file can be obtained based on the position number of a flag of a file that is strictly selected using the character appearance map and, therefore, a high-speed opening process can be realized.

According to the second embodiment, archives that include a compressed file group including compressed files that are to be searched and that have described therein character strings are accessed; the compressed files are sorted in descending order of the frequency of accesses; the compressed files are combined in the descending order of the access frequency after the sorting such that the combined size does not exceed the storage capacity of a cache area for the storage area having stored therein the compressed file group; and the combined compressed file group is written from the storage area into the cache area prior to a search in the file group.

According to the second embodiment, compressed files having a high access frequency can be stored in the cache area with preference.

According to the third embodiment, a plurality of slave servers are accessed, each having stored therein archives that include a compressed file group including compressed files that have character strings described therein and that are to be searched; the archives are received from each of the slave servers; based on each character described in the file group to be searched for each set of received archives and compression parameters concerning the appearance frequency of each character, appearance frequencies are totaled for each character; thereby, a compression parameter that is common to the compressed file group is generated; based on the generated common compression parameter, a Huffman tree common to the compressed file group is generated; the compressed files are allocated to the slave servers such that sums of the access frequencies of each compressed file are substantially equivalent among the slave servers; and new archives including the compressed file group allocated to each slave server and the common Huffman tree are transmitted to the slave server to which the compressed files are allocated.

According to the third embodiment, archives including the compressed file group for which the access frequencies are equivalent can be distributed to the slave servers and, therefore, higher efficiency and a higher speed of a search among all the grid computers can to be facilitated.

According to the embodiments, an effect is exerted that, when a full text search is implement for a compressed file remaining in the compressed format, higher efficiency of the search process can be realized by enabling a higher-speed file accessing process.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A computer-readable, non-transitory medium storing therein an information managing program that causes a master server accessible to a plurality of slave servers that each stores therein a compressed file group including compressed files that are to be searched and that described therein character strings, to execute:

receiving the compressed file group from each of the slave servers;

expanding, each of the compressed file groups using a Huffman tree that is based on an appearance frequency of each character in each of the compressed file groups and that was used for compressing the compressed file group;

generating, based on the appearance frequency, a common compression parameter that is common to the compressed file groups by summing, for each character, the appearance frequency of each of the compressed file groups;

generating a common Huffman tree that is common to the compressed file groups, based on the common compression parameter;

recompressing, using the common Huffman tree, expanded files expanded at the expanding;

allocating re-compressed files recompressed at the recompressing to the slave servers such that sums of the access frequencies of the compressed files that are origins of the recompressed files are substantially equivalent among the slave servers; and transmitting new archives including the re-compressed files allocated to the slave servers at the allocating and the common Huffman tree to the slave servers, respectively.

2. The computer-readable recording medium according to claim 1, wherein the information managing program further causes the master server to execute:

selecting, successively, arbitrary leaves from the Huffman tree used for compression of the compressed file group in the archives, for each of the archives;

identifying leaves of identical characters as characters expanded by the leaves selected at the selecting, from the common Huffman tree;

setting a compression symbol allocated to the leaves identified at the identifying instead of the characters expanded using the selected leaves, to the selected leaves in the Huffman tree; and converting the compressed file group in the archives into a compressed file group compressed using the compression symbol set at the setting, using the Huffman tree after the setting at the setting, the allocating includes allocating the compressed files after the converting, to the slave servers such that the sums of the access frequencies of the compressed files that are conversion origins of the compressed files after the converting at the converting are substantially equivalent among the slave servers, and the transmitting includes transmitting the archives including the compressed file group after the converting at the converting and the common Huffman tree, to the slave server allocated the compressed files.

3. The computer-readable recording medium according to claim 1, wherein the allocating includes allocating such that sums of sort positions of the access frequencies are substantially equivalent among the slave servers.

* * * * *